United States Patent
Bohn et al.

(10) Patent No.: US 12,217,132 B2
(45) Date of Patent: Feb. 4, 2025

(54) QUANTUM COMPUTING USING METAMATERIAL ARRAYS

(71) Applicant: Quantinuum LLC, Broomfield, CO (US)

(72) Inventors: Matthew Bohn, Broomfield, CO (US); Adam Ollanik, Boulder, CO (US)

(73) Assignee: Quantinuum LLC, Broomfield, CO (US)

( * ) Notice: Subject to any disclaimer, the term of this patent is extended or adjusted under 35 U.S.C. 154(b) by 443 days.

(21) Appl. No.: 17/653,979

(22) Filed: Mar. 8, 2022

(65) Prior Publication Data

US 2022/0327414 A1  Oct. 13, 2022

Related U.S. Application Data

(60) Provisional application No. 63/201,018, filed on Apr. 8, 2021.

(51) Int. Cl.
*G06N 10/40* (2022.01)
*G02B 1/00* (2006.01)

(52) U.S. Cl.
CPC ............. *G06N 10/40* (2022.01); *G02B 1/002* (2013.01)

(58) Field of Classification Search
CPC ................................ G06N 10/40; G02B 1/002
See application file for complete search history.

(56) References Cited

U.S. PATENT DOCUMENTS

| 10,192,168 | B2* | 1/2019 | Rigetti | G06N 20/00 |
|---|---|---|---|---|
| 11,037,776 | B1 | 6/2021 | Makotyn et al. | |
| 2019/0266512 | A1* | 8/2019 | Shen | H04B 10/70 |
| 2019/0392352 | A1* | 12/2019 | Lampert | G06F 1/206 |
| 2022/0199391 | A1 | 6/2022 | Hayes et al. | |
| 2022/0270776 | A1 | 8/2022 | Ransford et al. | |

OTHER PUBLICATIONS

Bruzewicz, Colin D., et al., "Trapped-ion quantum computing: Progress and challenges", Applied Physics Reviews, May 29, 2019, vol. 6, No. 2, AIP Publishing, 46 pages.

(Continued)

*Primary Examiner* — Sean M Luck
(74) *Attorney, Agent, or Firm* — Alston & Bird LLP

(57) ABSTRACT

In various embodiments, a system comprising an atomic object confinement apparatus and one or more signal manipulation elements is provided. Each signal manipulation element (a) is associated with a respective atomic object position of the atomic object confinement apparatus and (b) is one of a collection array or an action array. A collection array is configured to, responsive to an emitted signal emitted by an atomic object at the respective atomic object position being incident on the collection array, provide an induced collection signal to a respective collection position. An action array is configured to, responsive to an incoming signal being incident on the action array, provide an induced action signal to the respective atomic object position. The one or more signal manipulation elements comprise metamaterial arrays and/or diffractive optical elements.

20 Claims, 20 Drawing Sheets

(56) References Cited

OTHER PUBLICATIONS

Destouches, N., et al., "99% efficiency measured in the-1st order of a resonant grating", Optics Express, May 2, 2005, vol. 13, No. 9, 6 pages, retreived from the Internet at <URL:https://opg.optica.org/DirectPDFAccess/26475256-0E74-4E8C-8645BD732090CB54_83712/oe-13-9-3230.pdf?da=1&id=83712&seq=0&mobile=no> on Nov. 8, 2022.

European Search Report and Search Opinion received for EP Application No. 22167317.1, mailed on Sep. 8, 2022, 9 pages.

Fu, Xiaojian, et al., "Recent progress on metamaterials: From effective medium model to real-time information processing system", Progress in Quantum Electronics, Pergamon Press, Oxford, GB, vol. 67, May 23, 2019 (May 23, 2019), XP085824881, 28 pages.

Ghadimi, Moji, et al., "Scalable ion-photon quantum interface based on integrated diffractive mirrors", Quantum Information, Jan. 31, 2017, vol. 3, No. 4, 4 pages, Nature Partner Journals, Springer Nature Limited, UK.

Ghadimi, Mojtaba, "Optical Interconnects for Trapped-Ion Quantum Transmitters", Thesis, Master of Science in Physics, Sep. 11, 2016, Griffith University, Queensland, Australia, retreived from the Internet at <URL://https://research-repository.griffith.edu.au/handle/10072/368010> on Nov. 8, 2022, 156 pages.

Hsu, Ting-Wei, et al., "Atom Trapping with Metasurface Optics", 2020 Conference on Lasers and Electro-Optics (CLEO), OSA, May 10, 2020 (May 10, 2020), pp. 1-2, XP033822399.

Lu, D. Y., et al., "Broadband reflective lens in visible band based on aluminum plasmonic metasurface," Optics Express, Dec. 24, 2018, vol. 26, No. 26, pp. 34956-34964 retreived from the Internet at <URL: https://opg.optica.org/oe/fulltext.cfm?uri=oe-26-26-34956&id=403389> on Nov. 9, 2022.

Solntsev, Alexander S., et al., "Metasurfaces for Quantum Photonics", Arxiv.org, Cornell University Library, 201 Olin Library Cornell University Ithaca, NY 14853, Jul. 29, 2020 (Jul. 29, 2020), XP081728978, 27 pages.

Su, Vin-Cent, et al., "Advances in optical metasurfaces: fabrication and applications [Invited]", Optics Express, May 14, 2019, vol. 26, No. 10, pp. 13148-13182, retreived from the Internet at <URL: https://doi.org/10.1364/OE.26.013148> on Nov. 9, 2022.

* cited by examiner

QUANTUM COMPUTING USING METAMATERIAL ARRAYS

CROSS-REFERENCE TO RELATED APPLICATIONS

This application claims priority to U.S. Provisional Application No. 63/201,018, filed Apr. 8, 2021, the contents of which are hereby incorporated herein in its entirety by reference.

TECHNICAL FIELD

Various embodiments relate to apparatuses, systems, and methods relating to the use of metamaterial structures to provide optical beams to and/or receive optical signals from confined atomic objects. An example embodiment relates to the providing of optical beams and/or receiving of optical signals from confined atomic objects of a quantum charge coupled device (QCCD)-based quantum computer.

BACKGROUND

When using an ion trap to perform quantum computing, gates and other functions of the quantum computer are performed by applying laser beams to ions contained within the ion trap. Delivering these laser beams to a large scale quantum computer is a significant challenge due to the low ion height above the trap, the Rayleigh range of the laser beams, and the amount of laser power that needs to be delivered to an ion within the trap to perform the functions of the quantum computer. Through applied effort, ingenuity, and innovation many deficiencies of prior laser beam application techniques have been solved by developing solutions that are structured in accordance with the embodiments of the present invention, many examples of which are described in detail herein.

BRIEF SUMMARY OF EXAMPLE EMBODIMENTS

Example embodiments provide methods, systems, apparatuses, computer program products and/or the like for providing one or more manipulation signals to an atomic object confined within an atomic object confinement apparatus and/or to capture and/or detect (optical) signals emitted by the atomic object. In various embodiments, the atomic objects are atoms, ions, pairs or groups of atoms and/or ions (e.g., ion crystals), and/or the like. For example, in various embodiments, the atomic objects are used as qubits of a quantum computer. In various such embodiments, the manipulation signals are configured to control photoionization, state preparation, qubit detection and/or reading, cooling, shelving, repumping, single qubit gates, and two qubit gates of the quantum computer. While example embodiments are described herein with respect to quantum computing applications (e.g., quantum charge coupled device (QCCD)-based quantum computers), various embodiments relate to atomic clocks and various other applications of atomic objects confined by respective atomic object confinement apparatuses, lithographically-defined arrays of quantum dots, and/or other applications requiring precise delivery of optical signals to particular locations and/or capturing of signals emitted at particular locations.

In various embodiments, the atomic object confinement apparatus has one or more metamaterial structures disposed/formed thereon and/or coupled/secured with respect thereto. In various embodiments, at least some of the metamaterial structures are configured such that a manipulation signal being incident on the metamaterial structures induces the metamaterial structures to emit a respective action signal onto a corresponding atomic object position and/or portion thereof. In various embodiments, at least some of the metamaterial structures are configured such that an emitted signal emitted by an atomic object at a corresponding atomic object position, induces the metamaterial structures to emit a collection signal toward collection optics configured to capture, detect, measure, and/or the like the collection signal.

According to an aspect of the present disclosure, a system is provided. In an example embodiment, the system comprises an atomic object confinement apparatus comprising a plurality of electrodes configured to generate a confinement potential configured to confine one or more atomic objects, the confinement potential defining a plurality of atomic object positions; and one or more signal manipulation elements. Each signal manipulation element of the one or more signal manipulation elements (a) is associated with a respective atomic object position of the plurality of atomic object positions and (b) is one of a collection array or an action array. The collection array is configured to, responsive to an emitted signal emitted by an atomic object located at the respective atomic object position being incident on the collection array, provide an induced collection signal to a respective collection position. the action array is configured to, responsive to an incoming signal generated by a manipulation source being incident on the action array, provide an induced action signal to the respective atomic object position.

In an example embodiment, the plurality of atomic object positions are disposed in a two-dimensional layout.

In an example embodiment, each of the one or more signal manipulation elements comprises a metamaterial array.

In an example embodiment, the one or more signal manipulation elements comprise at least one of (a) a metamaterial array or (b) a diffractive optical element (DOE).

In an example embodiment, the atomic object confinement apparatus is a surface ion trap.

In an example embodiment, the one or more signal manipulation elements comprise at least one collection array and one or more action arrays associated with the respective atomic object position.

In an example embodiment, the action array is configured for use in performing a quantum computer function selected from a group consisting of photoionization of an atomic object, state preparation of the atomic object, reading a quantum state of the atomic object, cooling the atomic object or an atomic object crystal comprising the atomic object, shelving the atomic object, repumping the atomic object, performing a single qubit gate on the atomic object, and performing a multiple qubit gate on a set of atomic objects comprising the atomic object.

In an example embodiment, the one or more metamaterial structures of the action array are wavelength-tuned for inducing an action beam of a wavelength used in performing the quantum computer function.

In an example embodiment, one or more metamaterial structures of the plurality of metamaterial structures are pillars extending from a surface of the atomic object confinement device a distance in a range of 0.5 nm to 1 µm.

In an example embodiment, each metamaterial structure of the plurality of metamaterial structures forms a metasurface.

In an example embodiment, a surface of the atomic object confinement apparatus defines a plane, the one or more signal manipulation elements are disposed on the surface, and the action array is configured to receive an incoming signal that is propagating transverse to the plane.

In an example embodiment, a surface of the atomic object confinement apparatus defines a plane and the collection position is located outside of the plane.

In an example embodiment, the one or more signal manipulation elements are metasurface lenses formed on a surface of the atomic object confinement apparatus.

In an example embodiment, at least one or more portions of a substrate of the atomic object confinement apparatus are transparent to at least one of light having a wavelength of the input signal or light having a wavelength of the emitted signal.

In an example embodiment, the one or more signal manipulation elements are disposed on a second substrate, the second substrate disposed such that a surface of the second substrate comprising at least one of the one or more signal manipulation elements faces a surface of a first substrate having the plurality of electrodes of the atomic object confinement apparatus disposed thereon.

In an example embodiment, the system further comprises a controller configured to control operation of the plurality of electrodes and the at least one manipulation source.

In an example embodiment, the controller is further configured to receive a signal indicative of the collection signal being incident at the collection position.

In an example embodiment, the system is part of a quantum computer and the controller is configured to control the operation of the plurality of electrodes and the at least one manipulation source to cause the quantum computer to execute at least a portion of a quantum circuit, wherein the one or more atomic objects are used as qubits of the quantum computer.

In an example embodiment, the system further comprises one or more optical elements configured to define an optical path from the manipulation source to the action array.

In an example embodiment, the one or more optical elements comprise at least one of a double-layer metasurface beam splitter; a photonic integrated circuit chip and one or more bulk optical components; or a photonic integrated circuit chip having integrated metasurfaces.

In an example embodiment, the system further comprises collection optics located at the collection position corresponding to the respective atomic object position, and one or more photodetectors optically coupled to the collection optics, the one or more photodetectors configured to generate a signal indicative of the collection signal being incident on the collection optics.

In an example embodiment, a plurality of action arrays are associated with the respective atomic object position, first action array of the plurality of action arrays configured to provide a first induced action signal responsive to the action signal being incident thereon and a second action array of the plurality of action arrays configured to provide a second induced action signal responsive to the action signal being incident thereon, the first induced action signal and the second induced action signal differing in at least one of a beam width at the respective atomic object position or a propagation path through the respective atomic object position.

In an example embodiment, the one or more signal manipulation elements comprises an alignment arrangement comprising at least one signal manipulation element.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

Figure 10A:
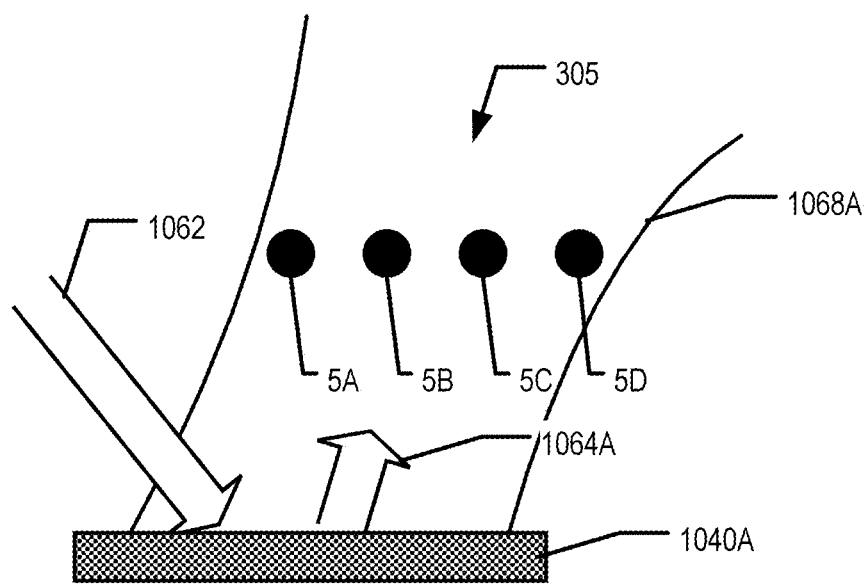
Figure 10B:
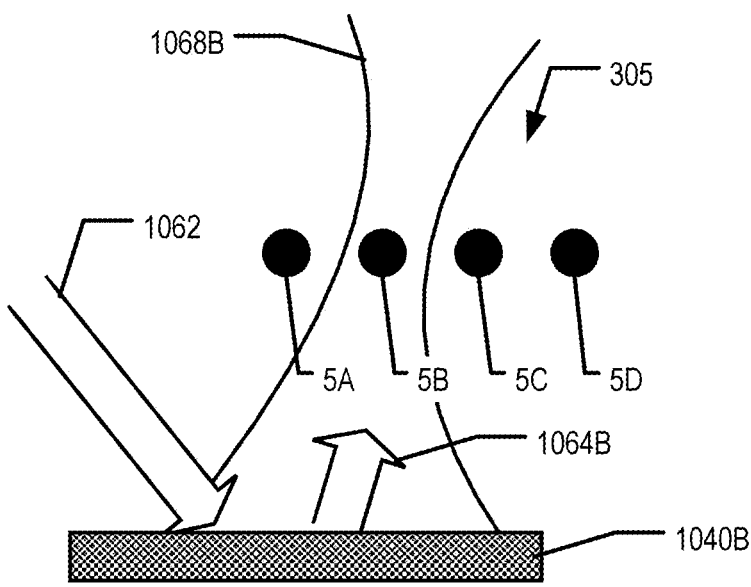
Figure 10C:
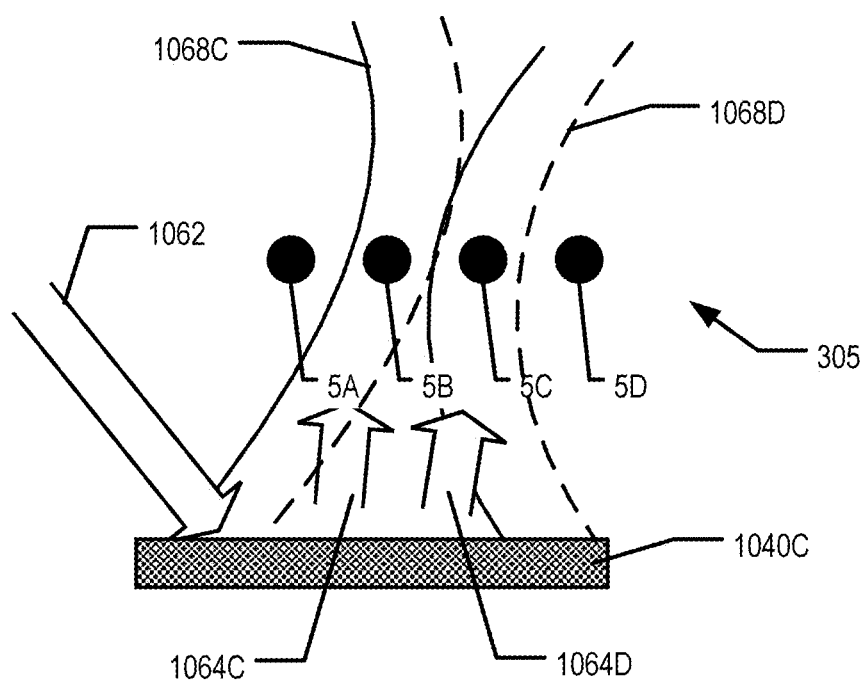

FIGS. 10A, 10B, and 10C are each schematic diagrams illustrating the beam profiles of respective action signals induced by an action signal being incident on the respective signal manipulation element, according to various embodiments.

Figure 11:
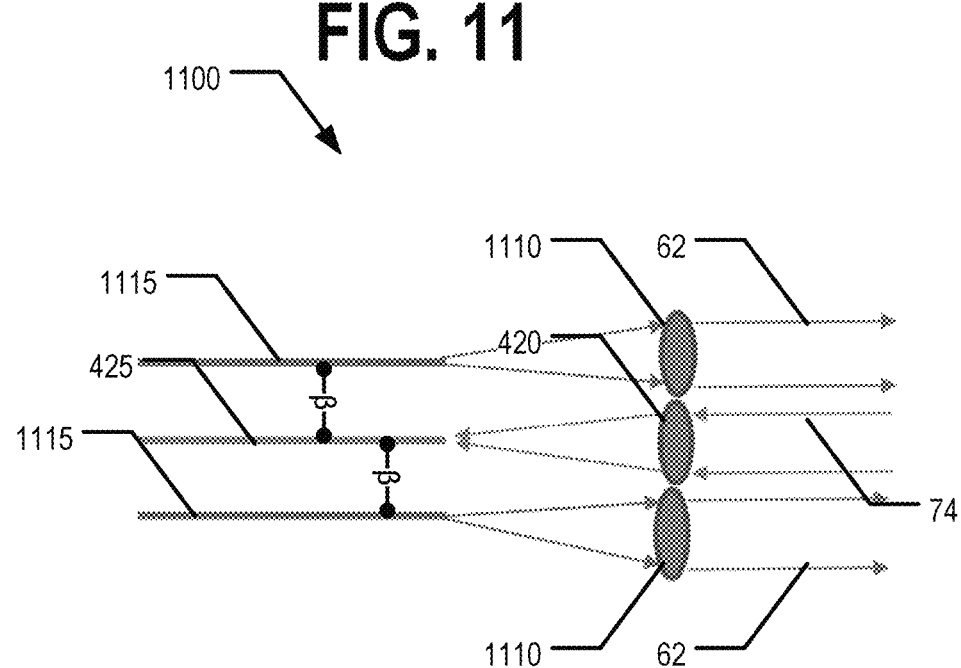

FIG. 11 is a partial cross-sectional view of an optical assembly configured to provide manipulation signals to and/or to receive collected signals from metamaterial structures on a surface of an atomic object confinement apparatus, according to an example embodiment.

Figure 12:
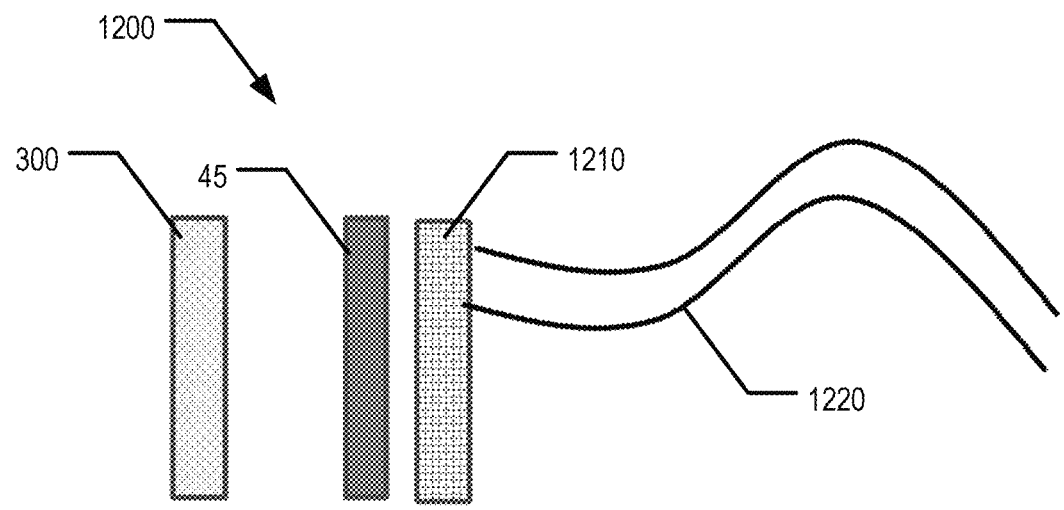

FIG. 12 is a partial cross-sectional view of an optical configuration configured to provide manipulation signals to and/or to receive collected signals from metamaterial structures on a surface of an atomic object confinement apparatus, according to an example embodiment.

Figure 13:
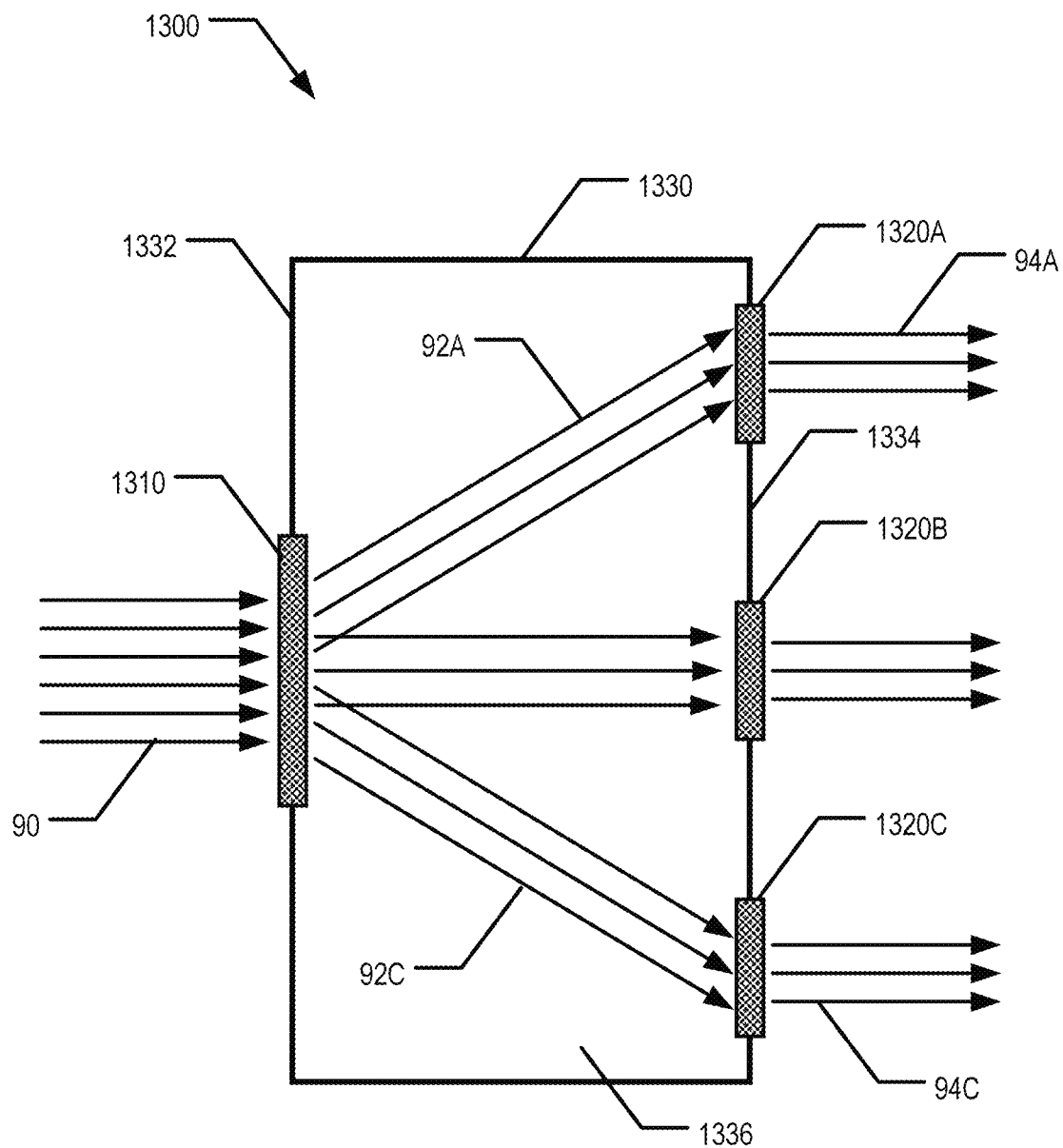

FIG. 13 illustrates an example double-layer metamaterial array beam splitter configured for use in delivering manipulation signals to atomic object positions, according to an example embodiment.

Figure 14A:
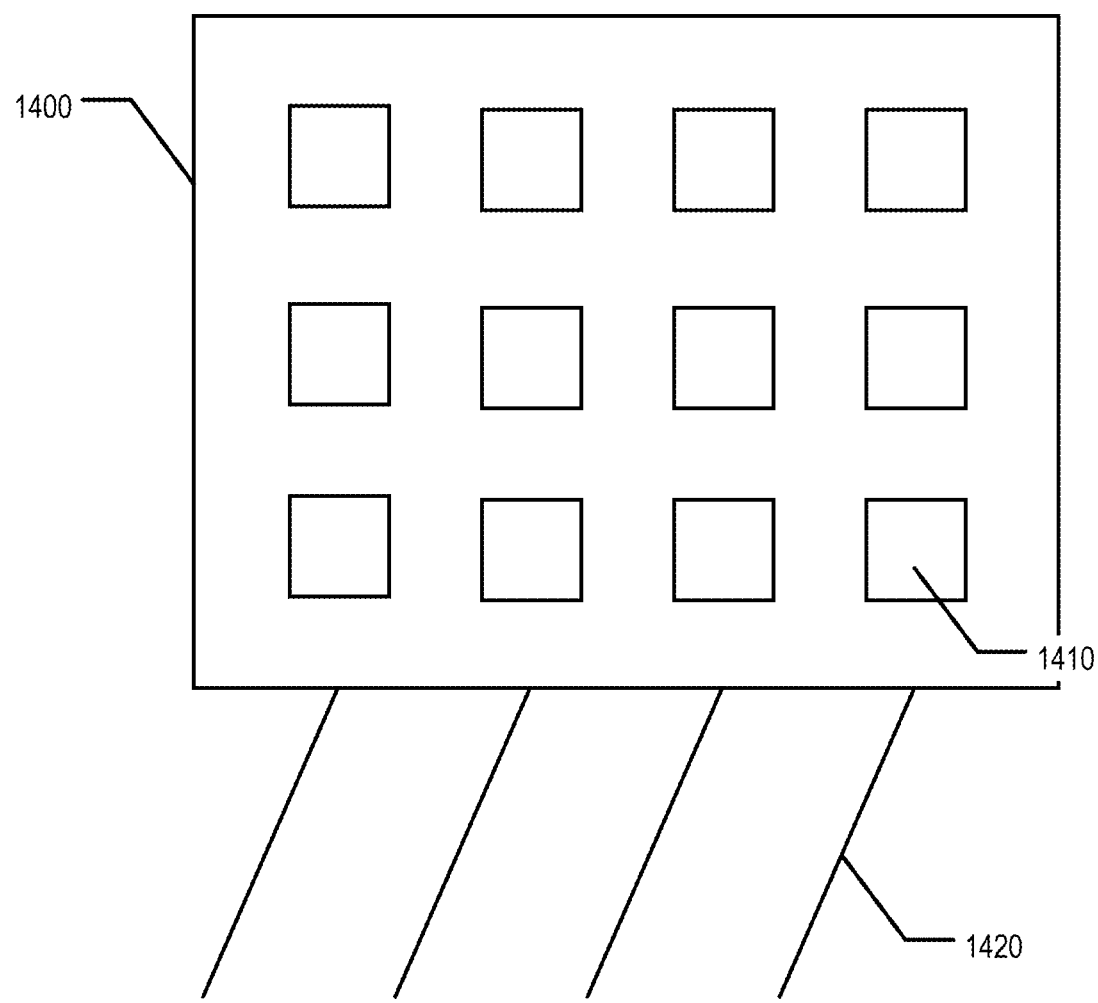

FIG. 14A provides a front view of an example photonic integrated circuit (PIC) configured for use in delivering manipulations signals to atomic object positions, according to an example embodiment.

Figure 14B:
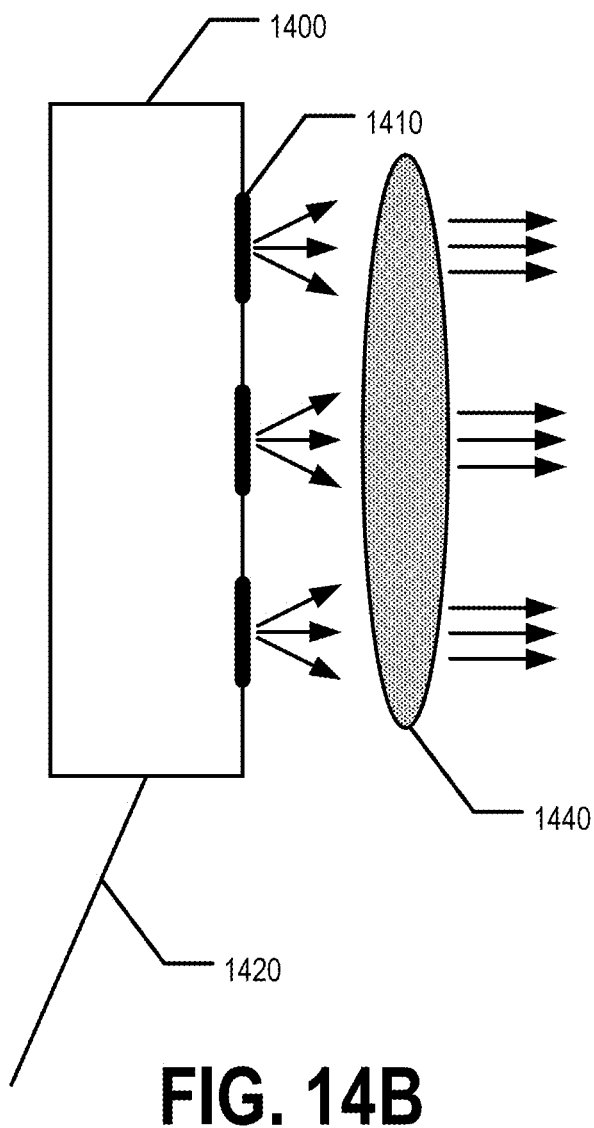

FIG. 14B provides a side view of an example PIC and corresponding bulk optics configured for use in delivering manipulation signals to atomic object positions, according to an example embodiment.

Figure 14C:
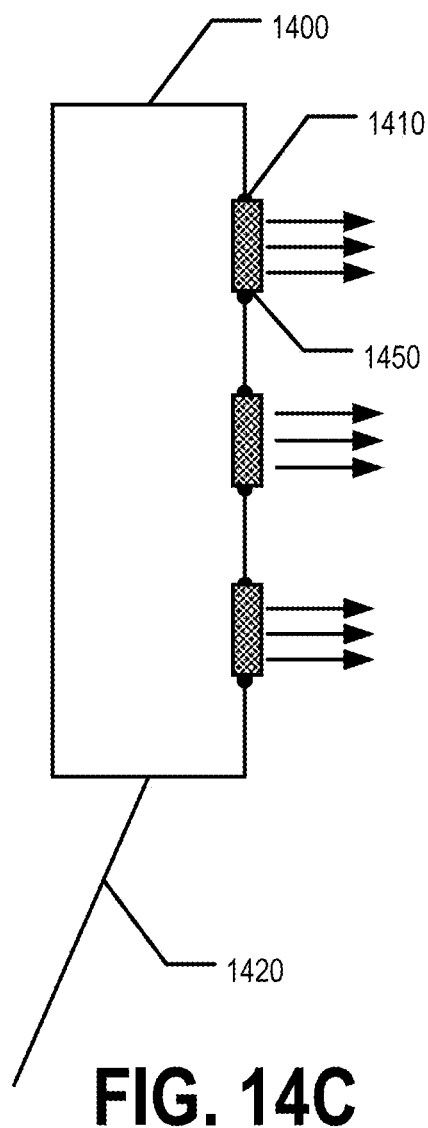

FIG. 14C provides a side view of an example PIC having integrated metamaterial arrays and configured for use in delivering manipulations signals to atomic object positions, according to an example embodiment.

Figure 15A:
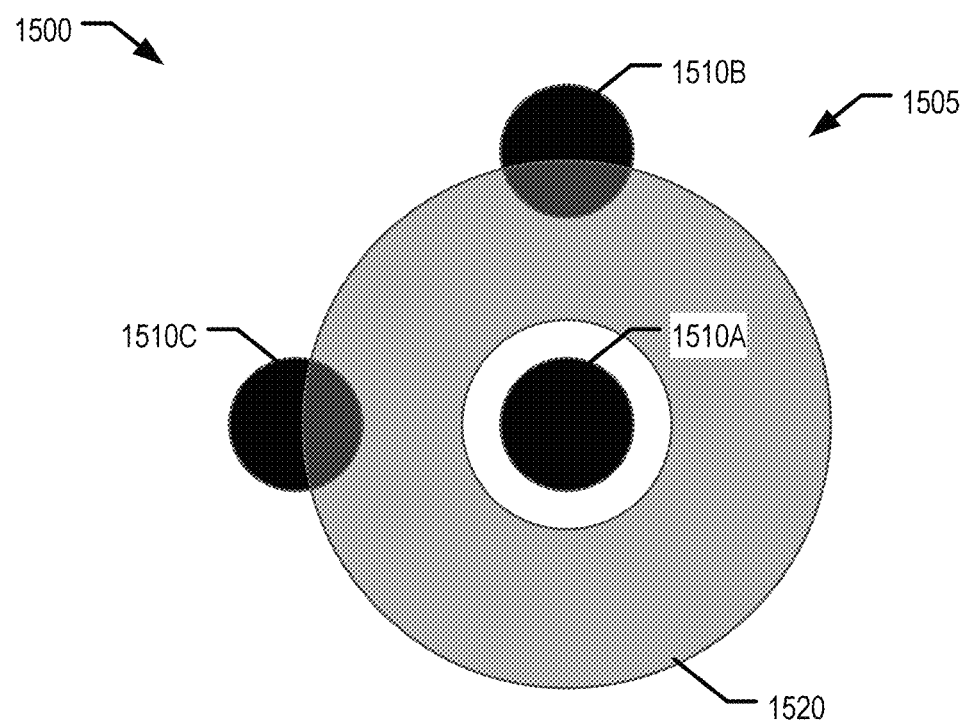
Figure 15B:
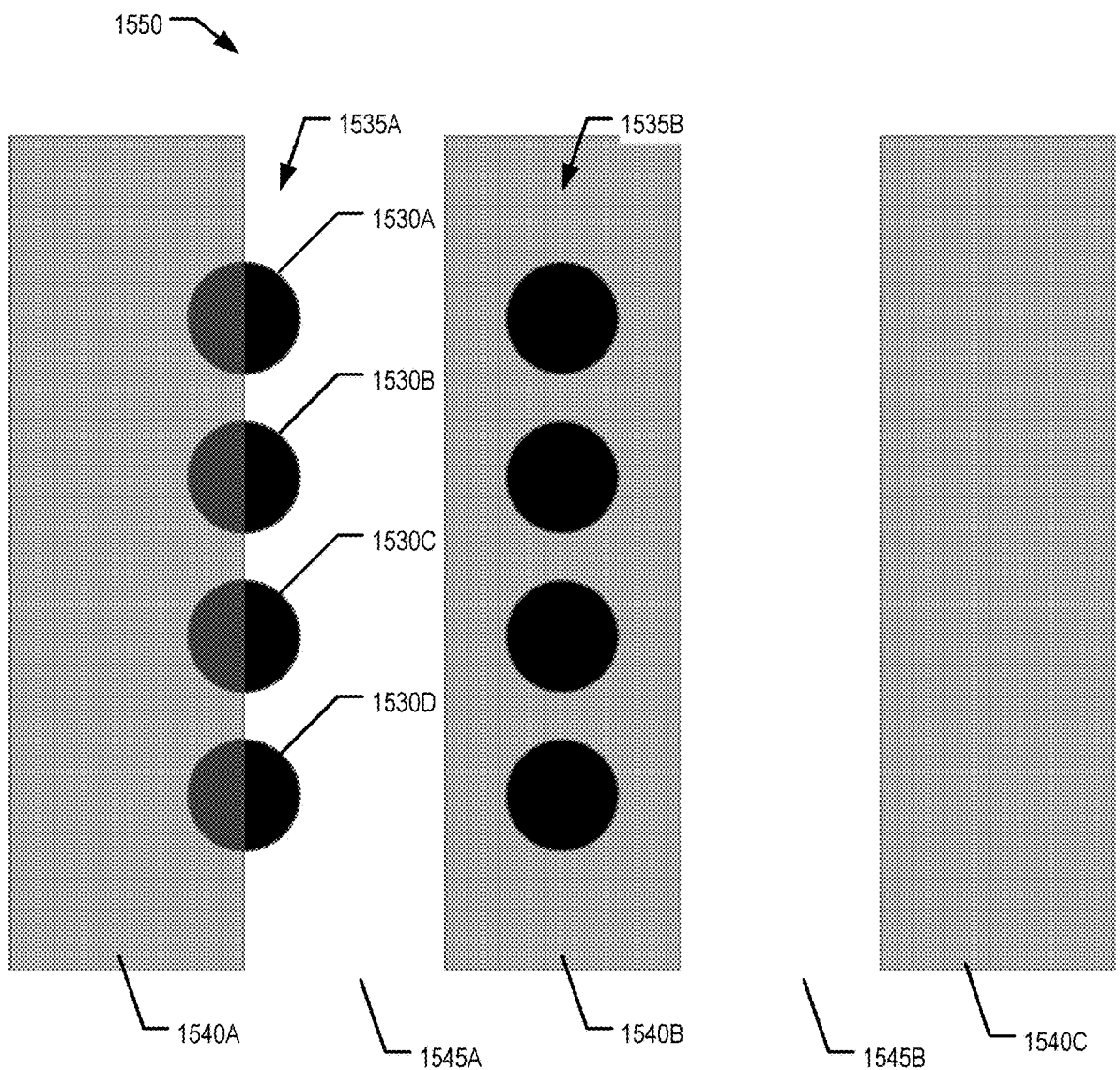

FIGS. 15A and 15B each illustrate an example portion of an alignment arrangement of signal manipulation elements configured for use in a respective alignment operation, according to various embodiments.

Figure 16:
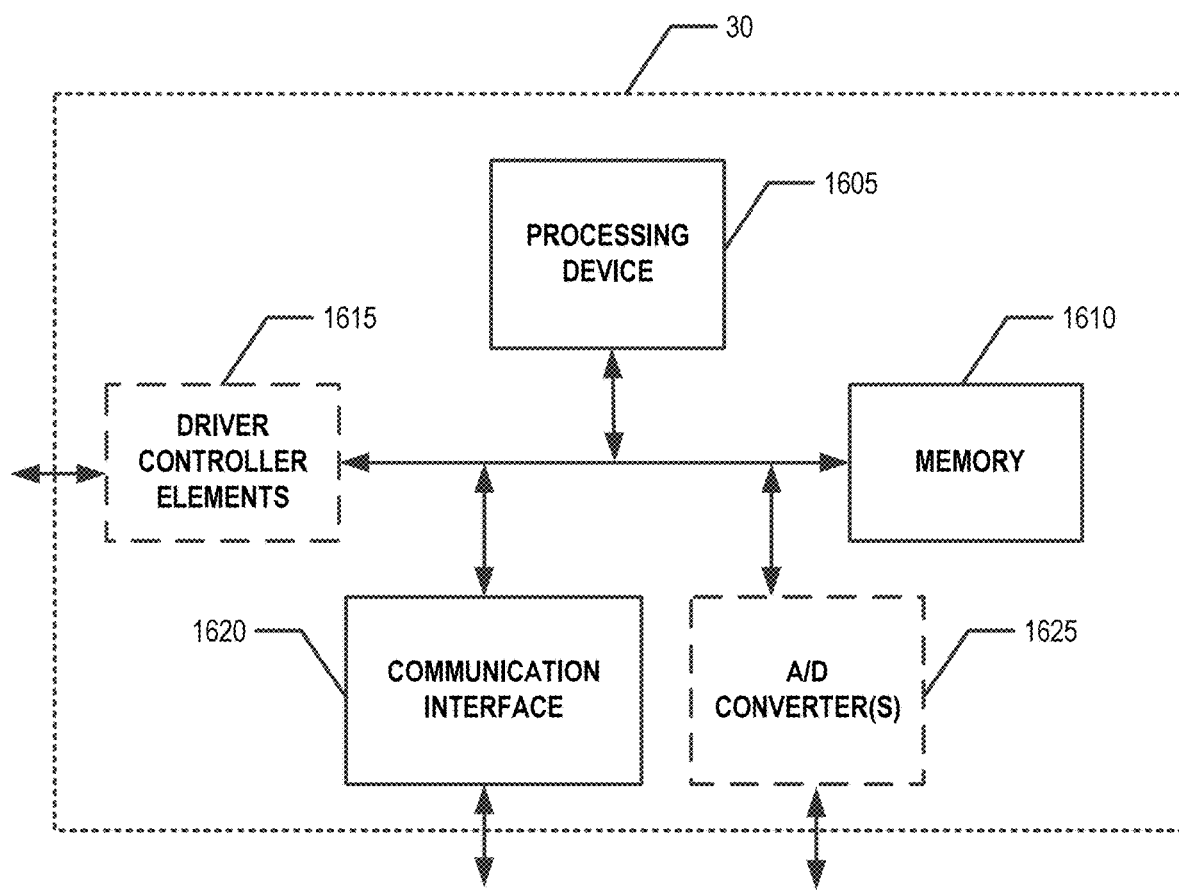

FIG. 16 provides a schematic diagram of an example controller of a quantum computer configured to perform one or more deterministic reshaping and/or reordering functions, according to various embodiments.

Figure 17:
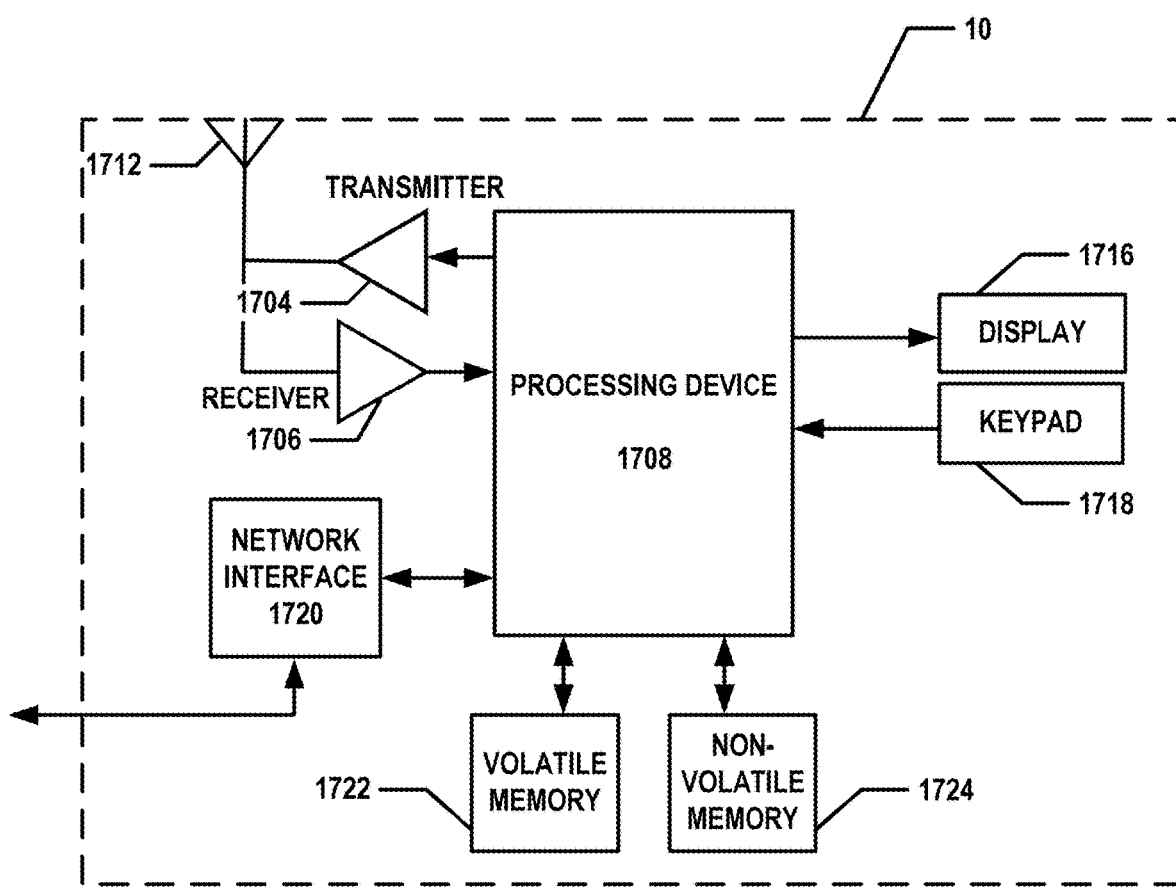

FIG. 17 provides a schematic diagram of an example computing entity of a quantum computer system that may be used in accordance with an example embodiment.

DETAILED DESCRIPTION OF SOME EXAMPLE EMBODIMENTS

The present invention now will be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. The term "or" (also denoted "/") is used herein in both the alternative and conjunctive sense, unless otherwise indicated. The terms "illustrative" and "exemplary" are used to be examples with no indication of quality level. The terms "generally," "substantially," and "approximately" refer to within engineering and/or manufacturing tolerances and/or within user measurement capabilities, unless otherwise indicated. Like numbers refer to like elements throughout.

In various embodiments, methods, apparatuses, systems, computer program products, and/or the like for providing manipulation signals to atomic object positions within an atomic object confinement apparatus and/or collecting, capturing, detecting, and/or measuring emitted signals emitted by atomic objects confined by the atomic object confinement apparatus. For example, various embodiments provide a signal management system associated with and/or comprising the atomic object confinement apparatus and comprising one or more signal manipulation elements. In various embodiments, one or more signal manipulation elements are used to provide the manipulation signals to atomic object positions defined by the atomic object confinement apparatus and/or collect, capture, detect, and/or measure emitted signals emitted by atomic objects located at atomic object positions.

In various embodiments, the atomic object is an atom and/or ion. The atomic object may be qubit atomic object of an atomic object crystal comprising two or more atomic objects, with, in an example embodiment, the two or more atomic objects of the atomic object crystal comprising atomic objects of at least two different atomic numbers. In an example embodiment, the atomic object confinement apparatus is an ion trap (e.g., a surface ion trap, Paul trap, and/or the like).

In various embodiments, the one or more signal manipulation elements are disposed and/or mounted with respect to the atomic object confinement apparatus such that the signal manipulation elements form at least a portion of respective optical paths between respective atomic object positions and respective manipulation sources and/or photodetectors.

In various embodiments, at least one of the signal manipulation elements of the signal management system is disposed on a surface of the atomic object confinement apparatus and/or at least partially within a first substrate on which the atomic object confinement apparatus is formed. For example, the atomic object confinement apparatus is formed on a first substrate, in various embodiments, with the at least one signal manipulation element formed and/or disposed on a surface of the first substrate. As should be understood, the first substrate may comprise multiple layers of circuitry configured to control various elements/components of the operation of the functioning of the atomic object confinement apparatus. In an example embodiment, at least one of the signal manipulation elements is part of the atomic object confinement apparatus and set back and/or recessed with respect to the surface of the atomic object confinement apparatus. For example, the at least one signal manipulation element may be located at a fabricated layer that is within the first substrate and/or not directly on the surface defined by the plane of the atomic object confinement apparatus. For example, there may be a hole or opening in the surface of the atomic object confinement apparatus with the at least one signal manipulation element recessed therein. In an example embodiment, a transparent layer encloses the at least one signal manipulation element within the hole or opening. Various embodiments provide an atomic object confinement apparatus having one or more signal manipulation elements formed and/or disposed on the surface of the atomic object confinement apparatus and/or as part of the substrate comprising the atomic object confinement apparatus.

An example embodiment provides a second substrate having one or more signal manipulation elements formed and/or disposed thereon and/or therein that is mounted in a secured relationship with respect to the atomic object confinement apparatus such that manipulation signals can be provided to the atomic object positions via respective signal manipulation elements of the second substrate.

In various embodiments, each signal manipulation element is formed and/or configured for use in performing one or more functions (photoionization, state preparation, qubit detection and/or reading, cooling, shelving, repumping, single qubit gates, or two qubit gates) of a QCCD-based quantum computer. For example, in various embodiments, a signal management element is a metamaterial array comprising a plurality of metamaterial structures. In various embodiments, each of the plurality of metamaterial structures are positive metamaterial structures (e.g., pillars, columns, cylinders, and/or the like). In various embodiments, each of the plurality of metamaterial structures are negative metamaterial structures (e.g., holes, pits, pockets, bubbles, and/or the like). In various embodiments, a metamaterial array may comprise a combination of positive and negative metamaterial structures. In various embodiments, some of the metamaterial arrays consist of and/or comprise positive metamaterial structures and other metamaterial arrays consist of and/or comprise negative metamaterial structures.

In various embodiments, each signal manipulation element is configured to provide a resonant response for incident signals (e.g., incoming manipulation signals and/or emitted signals) of a respective particular wavelength range. For example, for an incident signal (and/or portion thereof) characterized by a wavelength within the respective particular wavelength range, the signal manipulation element will be induced to emit a controlled induced signal (e.g., controlled in terms of direction, focus, beam profile, polarization, and/or the like) as a result of the incident signal being incident on the signal manipulation element. However, if the incident signal (and/or portions of the incident signal) that are characterized by one or more wavelengths outside of the respective particular wavelength range, the resulting signal would have a uniform phase delay applied thereto but would not experience the focusing, polarization control, beam profile control, and/or the like of the controlled induced signal. In other words, the signal manipulation elements may be used as chromatic filters, in various embodiments. For example, one or more signals of various wavelengths and/or a signal comprising various wavelengths may be made incident on a signal manipulation element. The chromatic filtering performed by the signal manipulation element (e.g., a metamaterial array configured to have a resonant response for a respective particular wavelength) causes the controlled induced signal to only include a respective particular wavelength and/or wavelengths of the respective particular wavelength range the signal manipulation element is configured for use with. For example, an incoming manipulation signal incident on a signal manipulation element will only be focused onto the corresponding atomic object position when the incoming manipulation signal is characterized by a wavelength within the respective particular wavelength range.

In various embodiments, a signal manipulation element is configured to have more than one manipulation signals incident thereon and be induced to emit respective action signals responsive thereto. For example, a signal manipulation element may be configured to, responsive to a first manipulation signal of a first wavelength and first polarization being incident thereon, be induced to emit a first action signal having a wavelength corresponding to the first wavelength, a polarization corresponding to the first polarization, and being directed toward a first portion of the corresponding atomic object position. The same signal manipulation element is configured to, responsive to a second manipulation signal of a second wavelength and a second polarization being incident thereon, be induced to emit a second action signal having a wavelength corresponding to the second wavelength, a polarization corresponding to the second polarization, and being directed to a second portion of the corresponding atomic object position, in an example embodiment. In various embodiments, the first wavelength and second wavelength are substantially the same and the first polarization and second polarization are different. In an example embodiment, the first wavelength and the second wavelength are different and the first polarization and the second polarization are substantially the same. In an example embodiment, the first wavelength and the second wavelength are different and the first polarization and the second polarization are different. The first portion of atomic object position and the second portion of the atomic object position may or may not overlap, as appropriate for the application. In various embodiments, the first manipulation signal and the second manipulation signal may be provided at least partially simultaneously. For example, the first manipulation signal and the second manipulation signal may be incident on the signal manipulation element at the same time for at least a part of the time that the first manipulation signal and/or the second manipulation signal are incident on the signal manipulation element. In an example embodiment, the first manipulation signal and the second manipulation signals are provided separately (e.g., not overlapping in time).

In various embodiments, a signal manipulation element is configured to be induced to emit an action signal and/or collection signal responsive to an incoming manipulation signal and/or emitted signal within a corresponding wavelength range being incident thereon. For example, each function of the quantum computer may be associated with one or more wavelengths. A respective signal manipulation element may therefore correspond to one or more functions of the quantum computer, where the one or more functions of the quantum computer correspond to wavelengths within the wavelength range at which the plurality of metamaterial structures of the respective signal manipulation element are configured to operate.

In various embodiments, with each signal manipulation element is associated with a corresponding atomic object position defined by the atomic object confinement apparatus. In various embodiments, one or more atomic object positions defined by the atomic object confinement apparatus are associated with an arrangement of signal manipulation elements comprising a plurality of signal manipulation elements. In various embodiments, each signal manipulation element an arrangement of signal manipulation elements associated with an atomic object confinement apparatus is configured to for use in performing one or more functions of the quantum computer (e.g., photoionization, state preparation, qubit detection and/or reading, cooling, shelving, repumping, single qubit gates, two qubit gates, emitted signal detection, and/or the like). For example, performance of various functions of the quantum computer may include use of manipulation signals and/or detection of emitted signals of various wavelengths. Various signal manipulation elements are configured for use at different wavelengths such that a particular signal manipulation element of an arrangement of signal manipulation elements is configured for use when performing one or more corresponding functions of the quantum computer at the associated atomic object position.

Conventionally, laser beams are provided to locations within an ion trap by transmitting the laser beams parallel to the plane of the ion trap such that the laser beams are incident on the ions within the ion trap. However, for atomic object confinement apparatuses that are two dimensional and/or that have larger dimensions, it is difficult to focus a laser beam at the ions within the ion trap without clipping the edge of the ion trap. Thus, a technical problem exists as to how to provide manipulation signals to an atomic object confinement apparatus that is able to scale with the size and/or dimensions of the atomic object confinement apparatus. For example, a technical problem exists regarding how to provide manipulation signals to atomic object positions of an atomic object confinement apparatus such as that shown in FIG. 2.

Various embodiments provide technical solutions to these technical problems. In particular, in various embodiments, the manipulation signals are sent transverse (e.g., approximately perpendicular, at approximately a 45 degree angle, and/or the like) to the plane of the atomic object confinement apparatus. For example, the manipulation signals are sent such that they are incident on a signal manipulation element and induce the signal manipulation element to emit an action signal that is directed toward the corresponding atomic object position. In other words, the signal management systems of various embodiments use signal manipulation elements to enable the manipulation signals to be provided transverse to the plane of the atomic object confinement apparatus. Thus, various embodiments provide technical solutions to technical problems regarding how to provide manipulation signals to an atomic object confinement apparatus such that manipulation signals are not sent parallel to the atomic object confinement apparatus plane such that the manipulation signals may be effectively provided to a two-dimensional trap.

Additionally, detecting an atomic object's quantum state also presents a challenge due to the large field of view required for the optics to collect and/or detect signals emitted by the atomic objects within a large and/or two-dimensional atomic object confinement apparatus. Various embodiments provide technical solutions to these technical problems by aiding in the collecting and/or directing emitted signals such that the signals emitted by the atomic objects are more efficiently captured, detected, and/or measured. For example, one or more collecting arrays of the signal manipulation elements of the signal management system may be disposed and/or configured such that, responsive to an emitted signal emitted by an atomic object being incident on the collecting array, induce a detecting beam to be emitted. In various embodiments, the detecting beam is emitted in a known direction such that the detecting beam may be captured (e.g., via collection optics and/or the like) and provided (e.g., via a fiber optics cable, waveguide, and/or the like) to a photodetector (e.g., photodiode, photomultiplier tube, charge-coupled device (CCD) sensor, complementary metal—oxide—semiconductor (CMOS) sensor, and/or other photodetector). Thus, various embodiments provide a solution to the large field-of-view technical problem of determining quantum states of atomic objects confined by a large and/or two-dimensional atomic object confinement apparatus.

Figure 1:
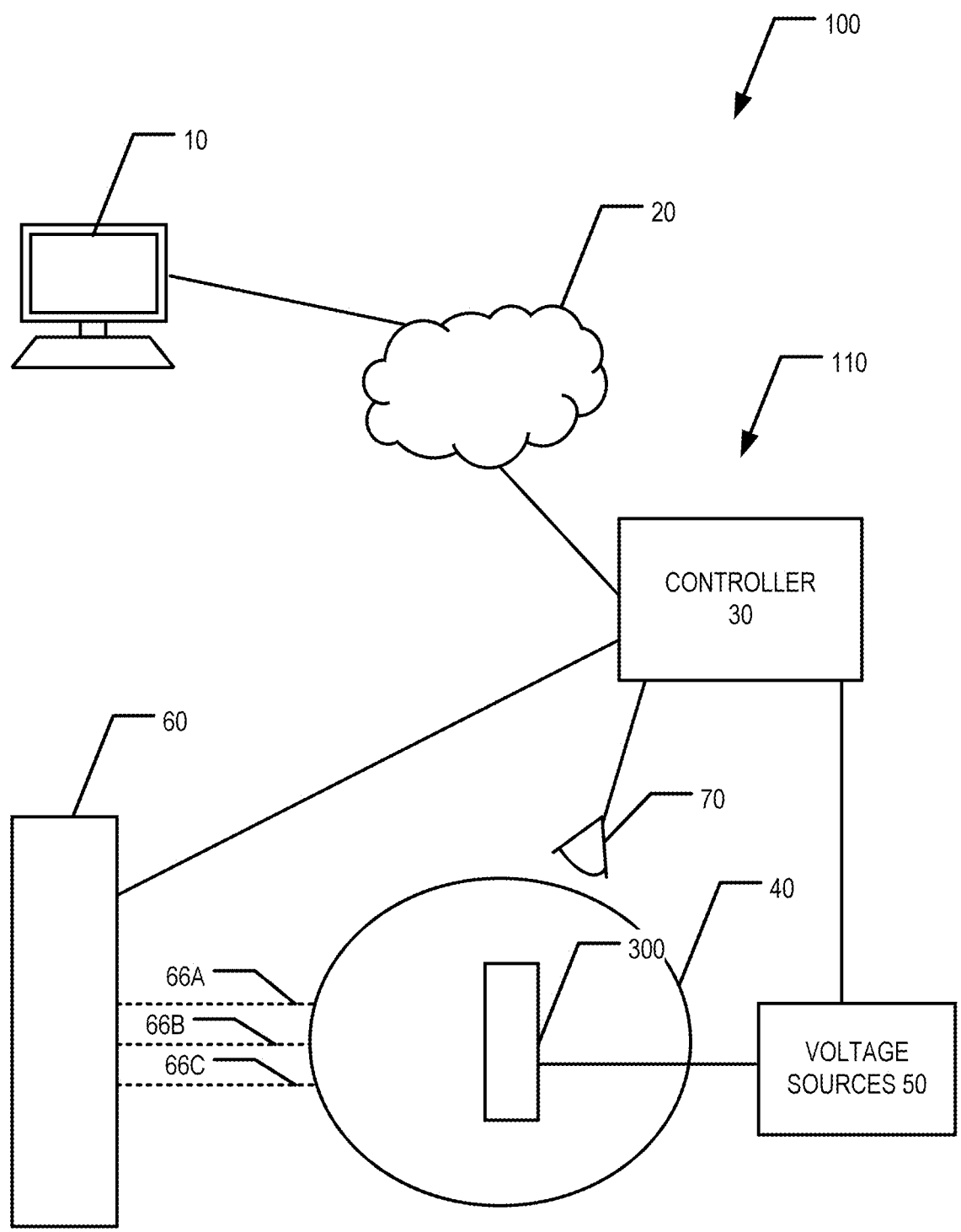
FIG. 1 is a schematic diagram illustrating an example quantum computing system comprising an atomic object confinement apparatus comprising metamaterial structures on a surface thereof, according to an example embodiment.

Example Quantum Computing System Comprising an Atomic Object Confinement Apparatus FIG. 1 provides a schematic diagram of an example quantum computing system 100 comprising an atomic object confinement apparatus 300 (e.g., an ion trap and/or the like), in accordance with an example embodiment. As shown in FIGS. 4A, 4B, 5, 6, and 14, in various embodiments, a plurality of signal manipulation elements are formed and/or disposed on a surface of the atomic object confinement apparatus. In various embodiments, at least a portion of the signal manipulation elements formed and/or disposed on the surface of the atomic object confinement apparatus are configured to be induced to emit an action signal toward and/or focused onto a respective atomic object position responsive to an incoming signal being incident thereon. The incoming signal is at least a portion of a manipulation signal generated by a manipulation source 60 of the quantum computer 110. In various embodiments, at least one signal manipulation element formed and/or disposed on the surface of the atomic object confinement apparatus is configured to be induced to emit a collection signal toward and/or focused onto a collection position (e.g., where corresponding collection optical elements are disposed) corresponding to the respective atomic object position responsive to an emitted signal emitted by an atomic object located at the respective atomic object position.

In various embodiments, the quantum computing system 100 comprises a computing entity 10 and a quantum computer 110. In various embodiments, the quantum computer 110 comprises a controller 30, a cryostat and/or vacuum chamber 40 enclosing a confinement apparatus 300 (e.g., an ion trap), and one or more manipulation sources 60. For example, the cryostat and/or vacuum chamber 40 may be a pressure-controlled chamber. In an example embodiment, the manipulation signals generated by the manipulation sources 60 are provided to the interior of the cryostat and/or vacuum chamber 40 (where the atomic object confinement apparatus 30 is located) via corresponding optical paths 66 (e.g., 66A, 66B, 66C). In various embodiments, the optical paths 66 are defined, at least in part by one or more components and/or elements of the signal management system. For example, at least one of the optical paths 66 comprises and/or is in part defined by a signal manipulation element of the signal management system.

In an example embodiment, the one or more manipulation sources 60 may comprise one or more lasers (e.g., optical lasers, microwave sources, and/or the like). In various embodiments, each manipulation source is configured to generate a manipulation signal 60 having a respective characteristic wavelength in the microwave, infrared, visible, or ultraviolet portion of the electromagnetic spectrum. In various embodiments, the one or more manipulation sources 60 are configured to manipulate and/or cause a controlled quantum state evolution of one or more atomic objects within the confinement apparatus. For example, in an example embodiment, wherein the one or more manipulation sources 60 comprise one or more lasers, the lasers may provide one or more laser beams to atomic objects trapped by the confinement apparatus 300 within the cryostat and/or vacuum chamber 40.

For example, a manipulation source 60 generates a manipulation signal that is provided as an incoming signal to an appropriate signal manipulation element of the signal management system. The incoming signal being incident on the signal manipulation element, for example a metamaterial array, induces the plurality of metamaterial structures of the metamaterial array to emit an action signal directed toward and/or focused at a corresponding atomic object position of the atomic object confinement apparatus. For example, the manipulation sources 60 may be configured to generate one or more beams that may be used to initialize an atomic object into a state of a qubit space such that the atomic object may be used as a qubit of the confined atomic object quantum computer, perform one or more gates on one or more qubits of the confined atomic object quantum computer, read and/or determine a state of one or more qubits of the confined atomic object quantum computer, and/or the like.

In various embodiments, the quantum computer 110 comprises an optics collection system 70 configured to collect and/or detect photons generated by qubits (e.g., during reading procedures). The optics collection system 70 may comprise one or more optical elements (e.g., lenses, mirrors, waveguides, fiber optics cables, and/or the like) and one or more photodetectors. In various embodiments, the photodetectors may be photodiodes, photomultipliers, charge-coupled device (CCD) sensors, complementary metal oxide semiconductor (CMOS) sensors, Micro-Electro-Mechanical Systems (MEMS) sensors, and/or other photodetectors that are sensitive to light at an expected fluorescence wavelength of the qubits of the quantum computer. In various embodiments, the detectors may be in electronic communication with the controller 30 via one or more A/D converters 1625 (see FIG. 16) and/or the like. For example, an atomic object being read and/or having its quantum state determined may emit an emitted signal, at least a portion of which is incident on a collection array of the signal management system. The emitted signal being incident on the collection array induces the plurality of metamaterial structures of the collection array to emit a detecting signal directed toward and/or focused at collection optics of the atomic object confinement apparatus. The collection optics are configured to provide the collection signal to a photodetector.

In various embodiments, the quantum computer 110 comprises one or more voltage sources 50. For example, the voltage sources 50 may comprise a plurality of voltage drivers and/or voltage sources and/or at least one RF driver and/or voltage source. The voltage sources 50 may be electrically coupled to the corresponding potential generating elements (e.g., electrodes) of the confinement apparatus 300, in an example embodiment.

In various embodiments, a computing entity 10 is configured to allow a user to provide input to the quantum computer 110 (e.g., via a user interface of the computing entity 10) and receive, view, and/or the like output from the quantum computer 110. The computing entity 10 may be in communication with the controller 30 of the quantum computer 110 via one or more wired or wireless networks 20 and/or via direct wired and/or wireless communications. In an example embodiment, the computing entity 10 may translate, configure, format, and/or the like information/data, quantum computing algorithms and/or circuits, and/or the like into a computing language, executable instructions, command sets, and/or the like that the controller 30 can understand and/or implement.

In various embodiments, the controller 30 is configured to control the voltage sources 50, cryostat system and/or vacuum system controlling the temperature and pressure within the cryostat and/or vacuum chamber 40, manipulation sources 60, optics collection system 70, and/or other systems controlling various environmental conditions (e.g., temperature, pressure, and/or the like) within the cryostat and/or vacuum chamber 40 and/or configured to manipulate and/or cause a controlled evolution of quantum states of one or more atomic objects within the confinement apparatus. For example, the controller 30 may cause a controlled evolution of quantum states of one or more atomic objects within the confinement apparatus to execute a quantum circuit and/or algorithm. For example, the controller 30 may cause a reading procedure comprising coherent shelving to be performed, possibly as part of executing a quantum circuit and/or algorithm. In various embodiments, the atomic objects confined within the confinement apparatus are used as qubits of the quantum computer 110.

Example Atomic Object Confinement Apparatus

In various embodiments, the atomic object confinement apparatus comprises a plurality of electrodes that are configured to generate a confining potential. For example, the controller 30 may control the voltage sources 50 to provide electrical signals to the electrodes of the atomic object confinement apparatus such that the electrodes generate a confining potential. The confining potential is configured to confine a plurality of atomic objects within a confinement volume defined by the atomic object confinement apparatus. For example, in an example embodiment, the atomic object confinement apparatus is a surface ion trap and the confinement volume is a volume located proximate the surface of the surface ion trap. In various embodiments, the electrodes and/or confining potential are configured to define a plurality of atomic object positions within the confinement volume.

In various embodiments, the atomic object positions are disposed in a one-dimensional or two-dimensional lay out. For example, in an example embodiment, the atomic object positions are disposed along an axis of a linear atomic object confinement apparatus. In another example embodiment, the atomic object positions are disposed in a two-dimensional array or layout defined by a two-dimensional atomic object confinement apparatus. An example linear atomic object confinement apparatus is described by U.S. application Ser. No. 16/717,602, filed Dec. 17, 2019, though various other linear atomic object confinement apparatuses may be used in various embodiments. An example two-dimensional atomic object confinement apparatus is described by U.S. application No. 63/199,279, filed Dec. 17, 2020, though various other two-dimensional atomic object confinement apparatuses may be used in various embodiments.

Figure 2:
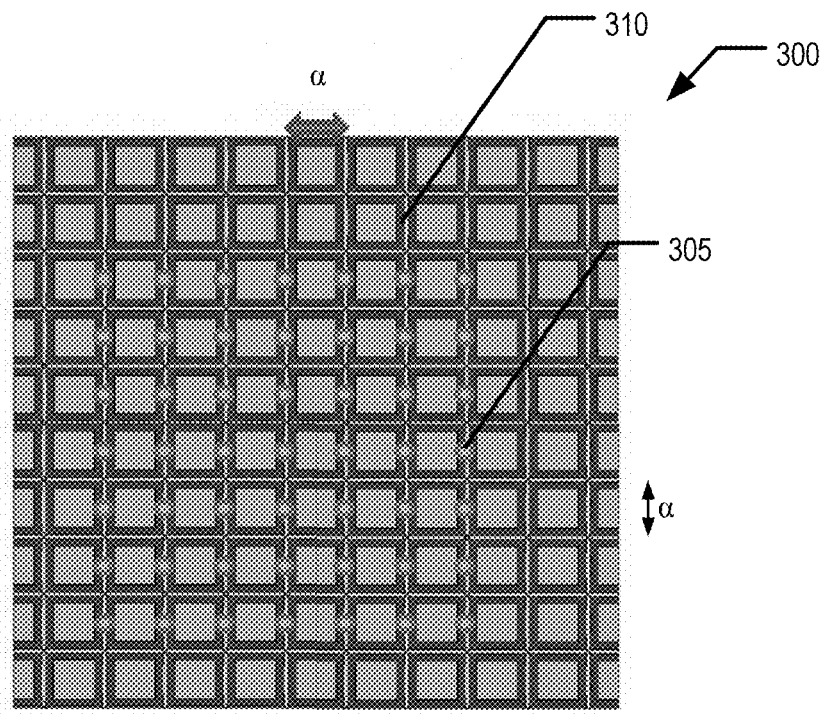
FIG. 2 is a schematic diagram of a portion of a surface of an atomic object confinement apparatus, according to an example embodiment.
Figure 3:
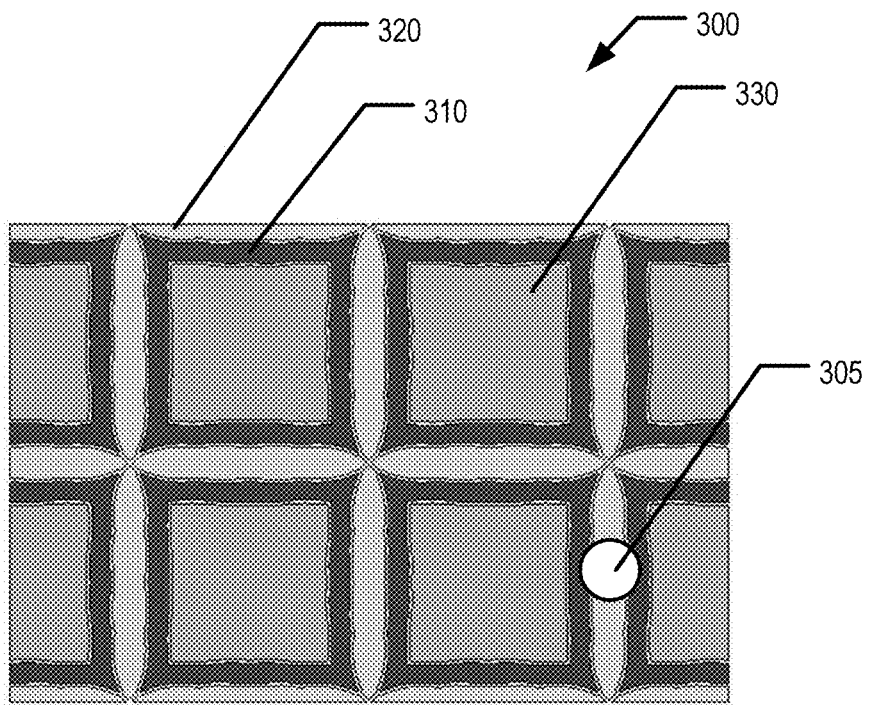
FIG. 3 is a schematic diagram of a zoomed in portion of the surface of the atomic object confinement apparatus shown in FIG. 2, according to an example embodiment.

In various embodiments, the confining potential evolves with time, based on the electrical signals provided to the electrodes by the voltage sources 50. The evolving of the confining potential may be configured to cause one or more atomic objects to move from respective first atomic object positions to respective second atomic object positions. FIGS. 2 and 3 each illustrate portions of an example two-dimensional atomic object confinement apparatus 300 comprising sequences of electrodes 310 that are separated by a spacing factor $\alpha$. In an example embodiment, the spacing factor $\alpha$ is in a range between 500 µm and 1000 µm (e.g., approximately 750 µm). The sequences of electrodes 310 define a plurality of atomic object positions 305. In various embodiments, an atomic object position 305 is a volume corresponding to a portion of an atomic object path 320 where the electrodes 310 are configured to maintain an atomic object (e.g., as part of an atomic object crystal) and/or a pair or set of atomic objects (e.g., for performing two or more qubit gates) for the performance of a function of the quantum computer and/or to store one or more atomic objects during the performance of functions of the quantum computer on other atomic objects located at other atomic positions.

In the illustrated embodiment, the sequences of electrodes 310 define a plurality of islands 330 and atomic object paths 320. In various embodiments, the atomic objects may travel between various atomic object positions 305 along atomic object paths 320. In general, the atomic objects are not located over the islands 330. In various embodiments, one or more signal manipulation elements (e.g., action arrays) may be disposed and/or formed on islands 330. In various embodiments, one or more signal manipulation elements (e.g., collection arrays) may be disposed and/or formed on the atomic object paths 320.

In various embodiments, the voltage sources 50 provide electrical signals to the potential generating elements (e.g., electrodes 310) of the confinement apparatus 300, such that a confining potential is formed. Based on the contours and time evolution of the confining potential one or more atomic objects are confined at respective atomic object positions, moved between atomic object positions and/or the like. When an atomic object is located at an atomic object position, one or more functions (e.g., quantum computing functions) may be performed on the atomic object. An example function that may be performed on an atomic object is photoionization of the atomic object. For example, a manipulation signal may be applied to the atomic object to photo ionize the atomic object.

Another example function that may be performed on an atomic object is state preparation of the atomic object. For example, one or more manipulation signals may be applied to the atomic object to prepare the atomic object in a particular quantum state. For example, the particular quantum state may be a state within a defined qubit space used by the quantum computer such that the atomic object may be used as a qubit of the quantum computer.

Another example function that may be performed on an atomic object is reading a quantum state of the atomic object. For example, a manipulation signal (e.g., a reading signal) may be applied to the atomic object. When the atomic object's wave function collapses into a first state of the qubit space, the atomic object will fluoresce in response to the reading signal being applied thereto. When the atomic object's wave function collapses into a second state of the qubit space, the atomic object will not fluoresce in response to the reading signal being applied thereto.

Another example function that may be performed on an atomic object is cooling the atomic object or an atomic object crystal comprising the atomic object. An atomic object crystal is a pair or set of atomic objects where one of the atomic objects of the atomic object crystal is qubit atomic object used as a qubit of the quantum computer and the one or more other atomic objects of the atomic object crystal are used to perform sympathetic cooling of the qubit atomic object. For example, a manipulation signal (e.g., a cooling signal or a sympathetic cooling signal) may be applied to the atomic object or atomic object crystal to cause the (qubit) atomic object to be cooled (e.g., reduce the vibrational and/or other kinetic energy of the (qubit) atomic object).

Another example function that may be performed on an atomic object is shelving the atomic object. In various embodiments, atomic objects in the second state of the qubit space may be shelved during the performance of a reading function. For example, a shelving operation may comprise causing the quantum state of an atomic object in the second state of the qubit space to evolve to an at least meta-stable state outside of the qubit space while a reading operation is performed. An example shelving process is describe by U.S. application No. 63/200,263, filed Feb. 25, 2021, though various other shelving processes may be used in various embodiments. In various embodiments, the shelving of an atomic object is performed by applying one or more manipulation signals to the atomic object to cause the atomic object's quantum state to evolve to an at least meta-stable state outside of the qubit space when the atomic object is in the second state of the qubit space.

Another example function that may be performed on an atomic object is (optical) repumping of the atomic object. In various embodiments, repumping of the atomic object comprises applying one or more manipulation signals to the atomic object to cause the quantum state of the atomic object to evolve to an excited state.

Another example function that may be performed on an atomic object is performing a single qubit gate on the atomic object. For example, one or more manipulation signals may be applied to the atomic object to perform a single qubit quantum gate on the atomic object.

Another example function that may be performed on an atomic object is performing a two qubit gate on the atomic object. For example, one or more manipulation signals may be applied to a pair or set of atomic objects that includes the atomic object to perform a two qubit (or three, four, or more) quantum gate on the atomic object and the at least one other atomic object.

In various embodiments, the atomic object confinement apparatus 300 comprises one or more signal manipulation elements. In various embodiments, the manipulation signals are provided transverse to a plane defined by a surface of the atomic object confinement apparatus 300 such that the manipulation signals are incident on corresponding signal manipulation elements. Each signal manipulation element is configured to, responsive to an incoming manipulation signal being incident thereon, induce an action signal that is emitted such that the action signal is directed to a respective atomic object position of the atomic object confinement apparatus 300 that corresponds to the signal manipulation element. The action signal is an appropriate signal (e.g., having an appropriate wavelength, polarization, amplitude, and/or the like) for causing the corresponding function to be performed responsive to the action signal (and possibly application of other action signals, magnetic fields, and/or the like) being incident on an atomic object (or set of atomic objects) at the corresponding atomic object position.

Example Signal Management Systems

In various embodiments, a signal management system is configured to control the provision and/or collection of signals to and/or from respective atomic object positions defined by the atomic object confinement apparatus 300. In various embodiments, the signal management system defines optical paths used to provide signals to respective atomic object positions and/or collection signals emitted by atomic objects located at respective atomic object positions. The optical paths comprise respective signal manipulation elements. In various embodiments, the signal manipulation elements are configured to enable the optical paths to be transverse to the surface 350 of the atomic object confinement apparatus.

Figure 8:
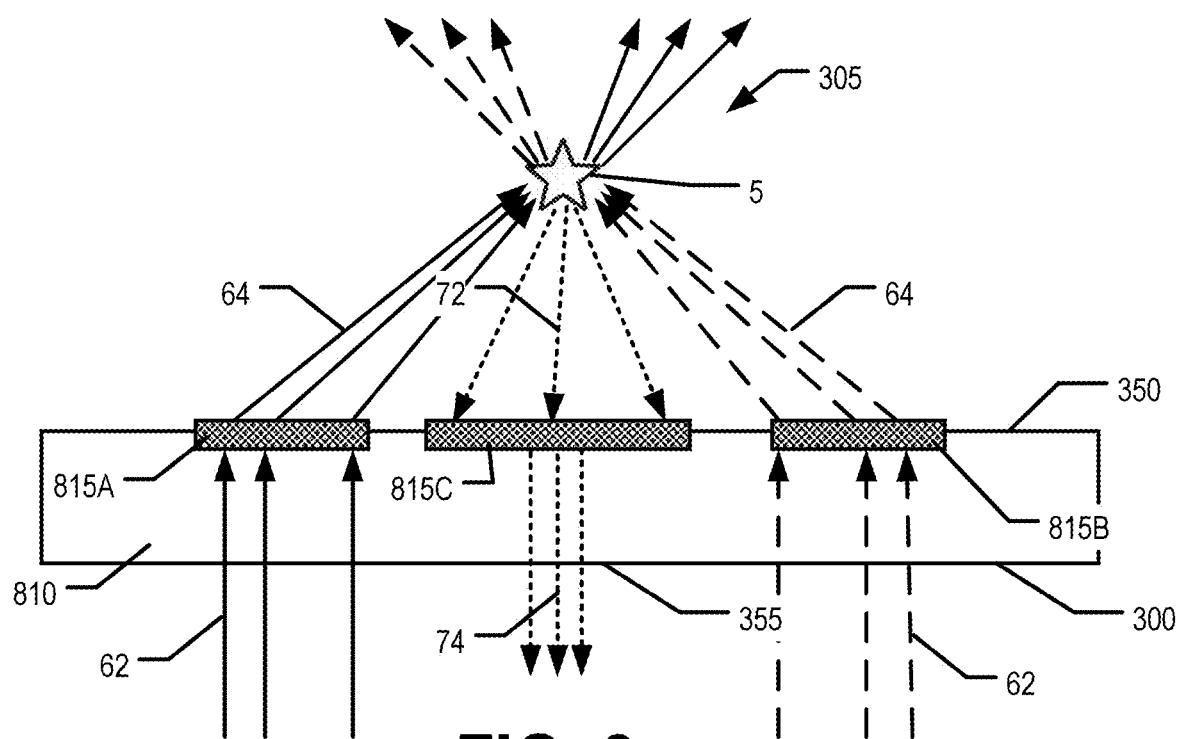
FIG. 8 is a schematic diagram of a translucent substrate delivery arrangement comprising signal manipulation elements on a surface of the atomic object confinement apparatus, according to an example embodiment.
Figure 9:
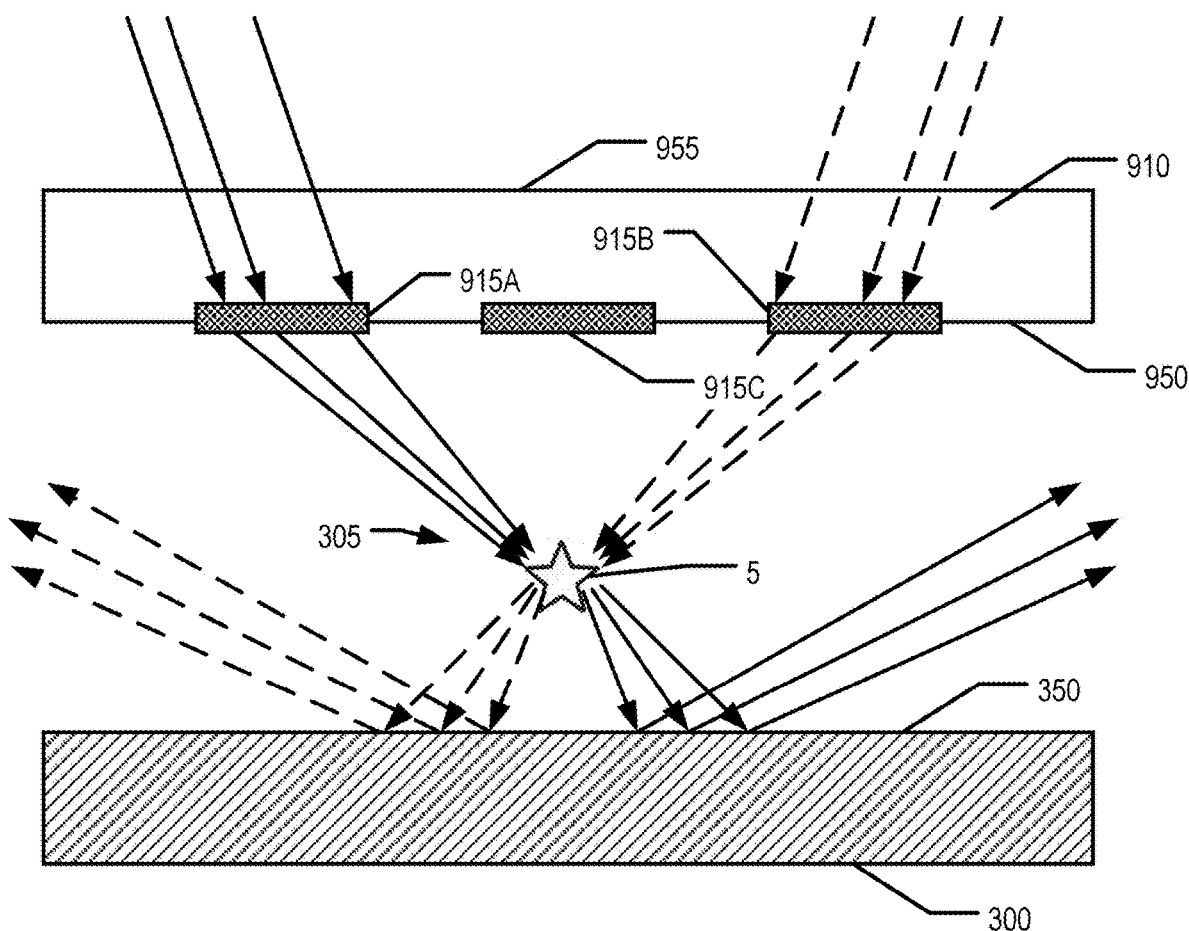
FIG. 9 is a schematic diagram of a flip chip signal delivery arrangement where a second substrate comprising signal manipulation elements is mounted in a secured relationship with respect to the atomic object confinement apparatus, according to an example embodiment.

Various embodiments are disclosed where the surface 350 of the atomic object confinement apparatus 300 comprises one or more signal manipulation elements. For example, in various embodiments, the surface 350 of the atomic object confinement apparatus 300 comprises an arrangement of signal manipulation elements for each atomic object position 305 defined by the atomic object confinement apparatus 300. Various embodiments are disclosed where the first substrate 810, upon which the atomic object confinement apparatus 300 is formed is transparent at one or more wavelengths and/or comprises waveguides and/or vias through which an incoming signal 62 and/or an outgoing collection signal 74 may propagate, as illustrated in FIG. 8. Various embodiments are disclosed where a second substrate 910 is mounted and/or secured in relationship to the atomic object confinement apparatus 300 and signal manipulation elements (and/or arrangements of signal manipulation elements) are formed and/or disposed on a surface of the second substrate, as illustrated in FIG. 9.

In various embodiments, the atomic object confinement apparatus 300 comprises one or more signal manipulation elements. In various embodiments, one or more of the signal manipulations elements are metamaterial arrays and each metamaterial array comprises a plurality of metamaterial structures which each define and/or comprise a respective metamaterial surface. The array of metamaterial structures (e.g., the composite surface formed by combining the respective metamaterial surfaces of the plurality of metamaterial structures) forms and/or provides a photonic metasurface. The terms metamaterial array and photonic metasurface are used interchangeably herein. A photonic metasurface is an engineered surface designed to manipulate light through coherent interference implemented through local control of the amplitude, phase, and/or polarization of reflected or transmitted light. This control is implemented by an array of optical scattering elements (e.g., the metamaterial structures), each of which have dimensions on the scale of the wavelength of light or smaller in at least one dimension, with spacing on the scale of the wavelength of light or smaller. For example, a photonic metasurface, as used herein, refers to the composite metasurface formed by the plurality of metamaterial structures of a metamaterial array. The metamaterial structures of a metamaterial array are approximately wavelength or sub-wavelength (e.g., nanometer scale), high contrast structures (compared to other portions of the surface of the atomic object confinement apparatus 300) whose geometry, size, arrangement, and orientation control the phase, amplitude, and polarization of electromagnetic waves. This control of the electromagnetic waves is not a result of the bulk material used to make the metamaterial structure, but rather a result of the size and shape of the metamaterial structures.

In various embodiments, the metamaterial structures are Huygen's metamaterial structures. For example, in various embodiments, inside each of the metamaterial structures, an electric dipole and a magnetic dipole are induced, causing each metamaterial structure to generate an electromagnetic wave like a Huygen's wavelet when an appropriate electromagnetic beam, signal, wave, and/or the like is incident on the metamaterial structure. The phases of the magnetic dipole and the electric dipole determine the phase, direction, and/or polarization of the electromagnetic wave, radiation, beam, and/or signal emitted by the metamaterial structure. In various embodiments, one or more plasmonic photonic metasurfaces are used. For example, a negative plasmonic photonic metasurface (e.g., holes in a flat metal surface) may be etched into a metal surface and/or portion thereof of the surface 350 of the atomic object confinement apparatus 300. In various embodiments, one or more photonic metasurfaces that are dielectric photonic metasurfaces configured to modify the geometric phase (e.g., Pancharatnam-Berry (PB) phase) using one or more electric or magnetic resonances are used. In various embodiments, dielectric photonic metasurfaces configured to modify propagation phase without resonance (e.g., truncated waveguides) are used. In various embodiments, the photonic metasurfaces are dielectric and/or plasmonic metasurfaces using two or more electric or magnetic resonances of any order to locally engineer the desired phase and amplitude response of the respective photonic metasurface. Various other types of metamaterial structures that define various types of metamaterial surfaces are used in various embodiments.

Photonic metasurfaces can be designed and/or configured to generate an electromagnetic wave, radiation, beam, and/or signal in a particular and/or designated direction due to the phases of the electric and magnetic dipoles, for example, being established at the surface of the component metamaterial structures. In various embodiments, the metamaterial structures comprise positive and/or negative structures that are shaped and/or sized such that the metamaterial array formed by the plurality of metamaterial structures is configured to provide an action signal to a respective atomic object position of the atomic object confinement apparatus responsive to an incoming signal being incident on at least a portion of the metamaterial array and/or to provide a collection signal to collection optics of the quantum computer responsive to an emitted signal being incident on at least a portion of the metamaterial array.

As described elsewhere herein, the photonic metasurfaces may be used to control the polarization of an induced signal (e.g., action signal and/or collection signal), focus and/or collimate the induced signal, chromatically filter the induced signal, control the phase of the induced signal, and/or the like.

In an example embodiment, at least one of the signal manipulation elements is a DOE or an assembly of DOEs. In general a DOE is an optical element having characteristics that have dimensions on a scale larger than the respective particular wavelength of light. For example, a signal manipulation element may be a DOE configured to control the polarization of an induced signal (e.g., action signal and/or collection signal), focus and/or collimate the induced signal, chromatically filter the induced signal, control the phase of the induced signal, and/or the like, in an example embodiment. In an example embodiment, a signal manipulation element comprises both a metamaterial array (e.g., a plurality of metamaterial structures) and a DOE component.

Figure 4A:
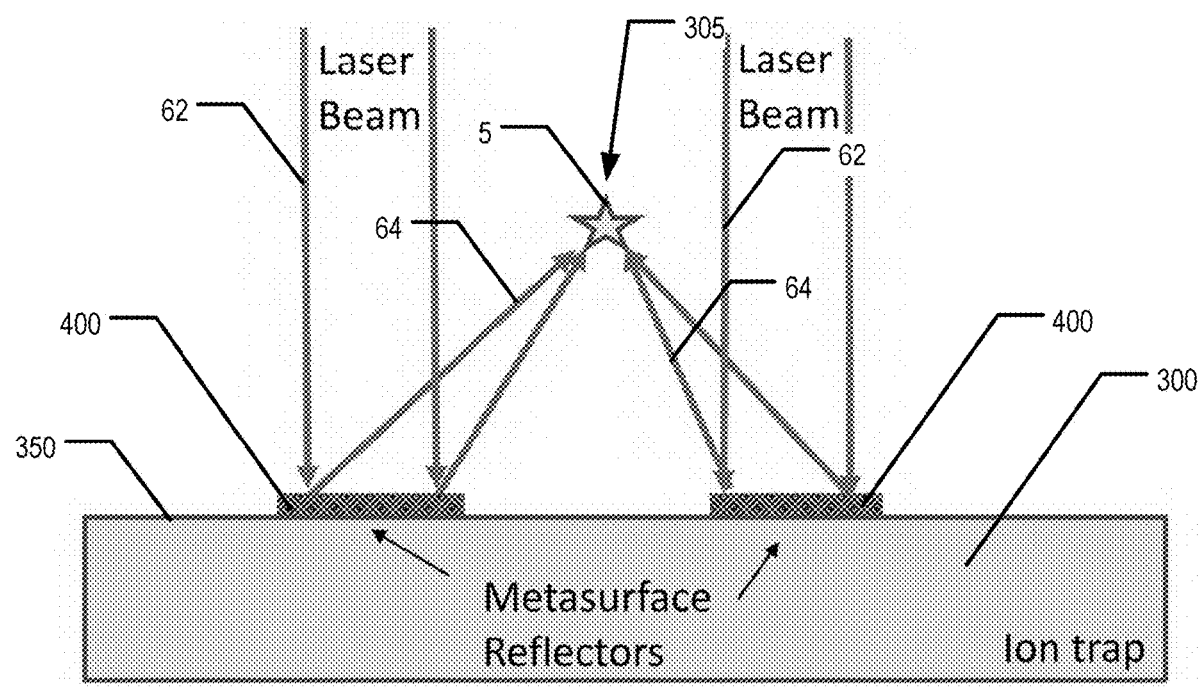
FIG. 4A is a partial cross-sectional view of an atomic object confinement apparatus comprising an action array formed of an array metamaterial structures on a surface thereof, according to an example embodiment.

In an example embodiment, the signal manipulation element(s) are formed, deposited, and/or disposed on the surface of atomic object confinement apparatus. FIG. 4A illustrates a partial cross-sectional view of an atomic object confinement apparatus wherein action arrays 400 are used to apply manipulation signals to an atomic object position 305. For example, the controller 30 controls one or more manipulation sources 60 to generate manipulation signals. The manipulation signals are provided to the atomic object confinement apparatus 300 as incoming signals 62 propagating transverse to a plane defined by a surface 350 of the atomic object confinement apparatus 300 such that the incoming signals 62 are incident on action arrays 400. The incoming signals 62 being incident on the action arrays 400 cause respective induced action signals 64 to be emitted toward the corresponding atomic object position 305. For example, the induced action signal 64 is incident on an atomic object 5 located at the atomic object position 305. As used herein, an action array 400 is a signal manipulation element configured to, responsive to an incoming signal generated by a manipulation source being incident on the action array, provide an induced action signal to the respective atomic object position. In the illustrated embodiment, the action arrays 400 are formed on portions of the surface 350 of the atomic object confinement apparatus 300 corresponding to the electrodes 310 and/or islands 330.

Figure 4B:
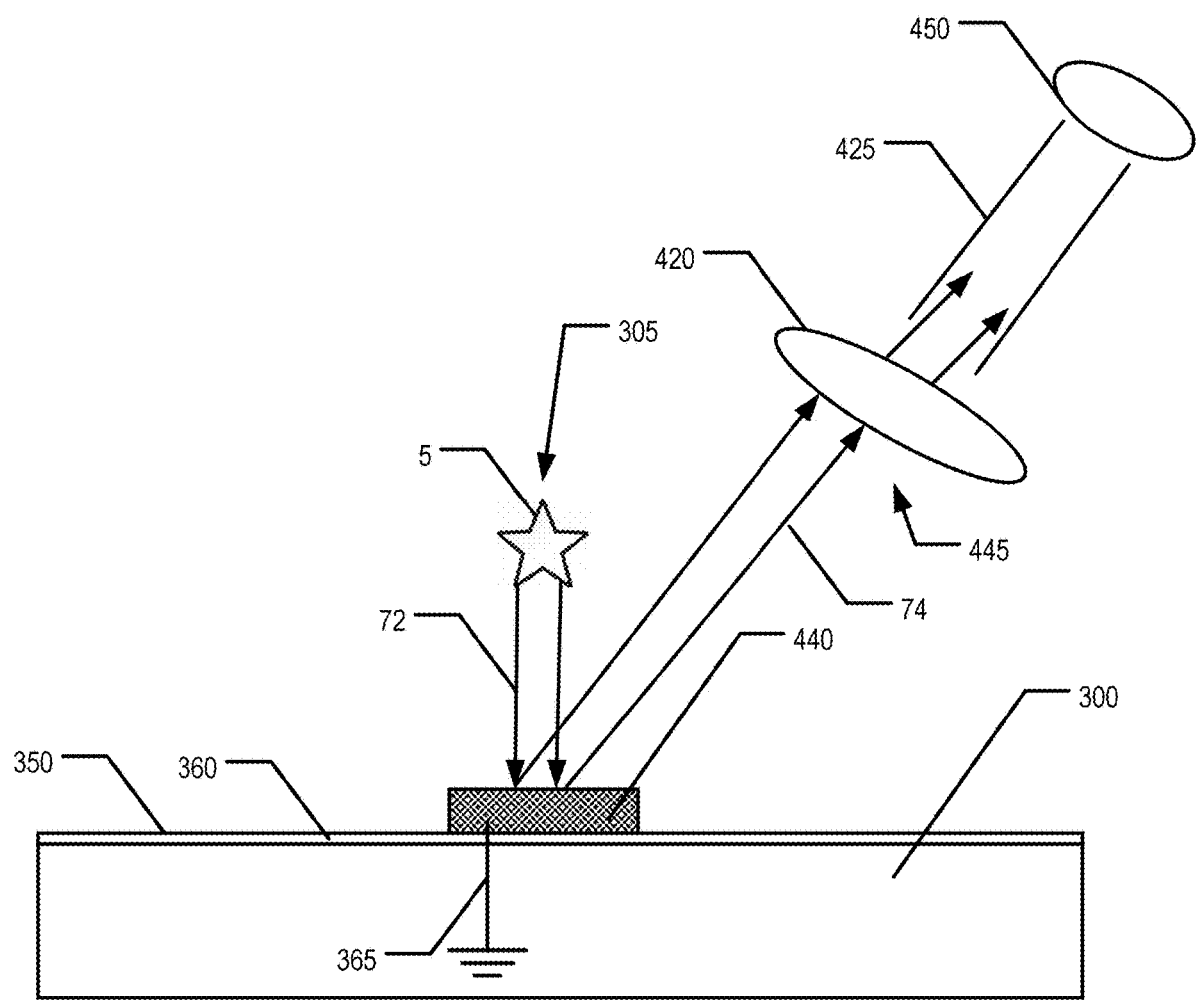
FIG. 4B is a partial cross-sectional view of an atomic object confinement apparatus comprising a collection array formed of an array of metamaterial structures on a surface thereof, according to an example embodiment.

FIG. 4B illustrates a partial cross-sectional view of an atomic object confinement apparatus wherein a collection array 440 is used to collect an emitted signal generated by an atomic object 5 at a respective atomic object position 305. For example, during a qubit reading function, for example, an atomic object 5 located at the atomic object position 305 may be caused to emit an emitted signal 72. At least a portion of the emitted signal 72 is incident on the collection array 440. The at least a portion of the emitted signal 72 being incident on the collection array 440 causes an induced collection signal 74 to be emitted from the collection array 440 and toward a collection position 445. In various embodiments, collection optics are located and/or disposed at the collection position 445. For example, in the illustrated embodiment, the collection optics comprise one or more optical elements, such as collection lens 420 configured to couple at least a portion of the collection signal 74 into a collection fiber 425.

As used herein, a collection array 440 is a signal manipulation element configured to, responsive to an emitted signal emitted by an atomic object located at the corresponding atomic object position being incident on the collection array, provide an induced collection signal to the corresponding collection position 445. In various embodiments, the collection array 440 is configured to provide an induced collection signal (responsive to an emitted signal being incident thereon) that is collimated toward, focused at, and/or the like the collection optics corresponding to the respective atomic object position 305.

In various embodiments, the collection arrays 440 are formed on portions of the surface 350 of the atomic object confinement apparatus 300 corresponding to the atomic object paths 320. For example, in the illustrated embodiment, the collection array 440 is generally disposed between the corresponding atomic object position 305 and the surface 350 of the atomic object confinement apparatus 300. In various embodiments, a collection array 440 is configured to collect emitted signal from a large solid angle about the respective atomic object position 305. For example, the collection array 440 may be positioned and sized to collect and/or have incident thereon emitted signal emitted into approximately and/or approaching 2π steradians. For example, from the perspective of an atomic object position 305, the collection array 440 may comprise more than π, 1.25π, 1.5π, 1.75π, and/or approximately 2π steradians of solid angle about the atomic object position 305.

Figure 4C:
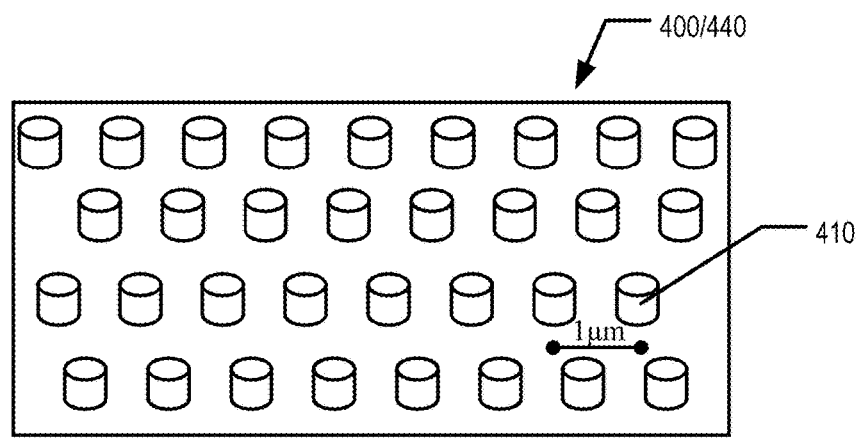
FIG. 4C is a partial perspective view of an array of metamaterial structures, according to an example embodiment.

FIG. 4C illustrates a portion of an example signal manipulation element, such as an action array 400 and/or a collection array 440. The example signal manipulation element comprises a plurality of metamaterial structures 410. The geometry, size, arrangement and/or orientation of the plurality of metamaterial structures 410 control the phase, amplitude and polarization of the induced action signal and/or collection signal emitted by the corresponding signal manipulation element. In various embodiments, each metamaterial structure of the plurality of metamaterial structures 410 is a pillar extend out from a surface 450 of the atomic object confinement device 300 a distance in a range of 0.5 nm to 1 µm. For example, the metamaterial structures are nanometer-scale structures. In various embodiments, the metamaterial structures are sub-wavelength structures. In various embodiments, a subwavelength structure is a structure that extends out from the surface 350 and/or has a diameter/side length that is less than the wavelength of incoming signals and/or emitted signals that are intended to be incident on the structure and/or that is less than the wavelength of action signals and/or collection signals that intended to be emitted by the structure. In various embodiments, the metamaterial structures may be formed or made of conductive material, semi-conductor material, and/or dielectric material. In various embodiments, the metamaterial structures are negative structures (e.g., holes, depressions, and/or the like).

In various embodiments, the energy of an incoming signal or an emitted signal is effectively transferred into the corresponding induced action signal or collection signal, respectively. For example, an induced action signal or collection signal carries approximately 90-99% of the energy and/or energy flux incident on the respective action array or collection array as the corresponding incoming signal or emitted signal, respectively. In various embodiments, an action signal providing 50-90 mW at the atomic object position is used for performing some functions of the quantum computer (e.g., a two qubit gate, in an example embodiment). The efficiency of the signal manipulation elements at converting energy and/or energy flux from an incoming signal to an action signal enables the performance of functions of the quantum computer with relatively high flux levels (e.g., approximately 100 mW) without requiring high power manipulation sources 60 to account for the loss in energy flux due to the use of a signal manipulation element in an optical path of a manipulation signal. Additionally, the efficiency of the signal manipulation elements at converting energy and/or energy flux from an emitted signal to a collection signal enables the effective detection of emitted signals (e.g., used in reading functions to determine a quantum state of qubit/atomic object).

In various embodiments, the radius and/or height (positive or negative) of the metamaterial structures and the spacing of metamaterial structures within a signal manipulation element (e.g., a metamaterial array) influences and/or defines the efficiency with which the signal manipulation element converts the energy and/or energy flux of an incoming signal into an action signal and/or an emitted signal into a collection signal.

In various embodiments, the shape of the metamaterial structures of a metamaterial array (e.g., in a cross-section in a plane substantially parallel to the surface 350 of the atomic object confinement apparatus 300) influences and/or defines the polarization of an induced action signal or collection signal emitted by the metamaterial array.

In various embodiments, the spacing and/or height of the metamaterial structures within a metamaterial array influences and/or defines the direction at which the induced action signal or collection signal emitted by the metamaterial array propagates. For example, the spacing and/or height of the metamaterial structures within an action array 400 may be configured to cause an induced action signal to be directed toward and/or focused at the corresponding atomic object position 305. For example, the spacing and/or height of the metamaterial structures within a collection array 440 may be configured to cause an induced collection signal to be directed toward and/or focused at the corresponding detection position 445.

In various embodiments a signal manipulation element is arranged and/or configured to generate a focusable beam. For example, an action array 400 may be configured to emit an induced action signal that is focused on the corresponding atomic object position 305. For example, a collection array 440 may be configured to emit an induced collection signal that is focused on the corresponding detection position 445.

In various embodiments, a signal manipulation element (e.g., an action array and/or a collection array) is formed on a surface 350 of the atomic object confinement apparatus 300 via one or more deposition and/or etching steps. For example, the signal manipulation elements may be formed on the surface 350 of the atomic object confinement apparatus 300 using one or at least one photo-lithography steps. In an example embodiment, a signal manipulation element is formed on the surface 350 of the atomic object confinement apparatus 300 using deep/extreme ultraviolet (D/EUV) lithography, electron beam lithography (EBL), nanoprint lithography, and/or the like.

In an example embodiment, a signal manipulation element formed on and/or disposed on the surface 350 of the atomic object confinement apparatus 300 has a diameter that is in a range of 5 µm to 200 µm (e.g., approximately 100 µm). In an example embodiment, the signal manipulation element is at least three times the particular wavelength that the signal manipulation element is configured for use with in diameter. In an example embodiment, an incoming signal is a beam focused to a diameter of approximately 32 µm. For example, the incoming signal may have a diameter of approximately 32 µm when the incoming signal interacts with the signal manipulation element. For example, the signal manipulation element may have a diameter that is larger (e.g., a factor of one to seven times larger) than the diameter of an incoming signal beam. In an example embodiment, the incoming signal beam has a diameter that is larger than at least one dimension of the signal manipulation element upon which the incoming signal is incident. In various embodiments, the geometry of the metal material structures of the signal manipulation element have a larger effect on the pointing of the induced action signal and/or collection signal than the angle of incidence of the incoming signal and/or emitted signal that was incident on the signal manipulation element to cause the generation of the action signal and/or collection signal, respectively.

In various embodiments, the action arrays 400 and/or collection arrays 440 of the atomic object confinement apparatus 300 are formed and/or disposed on the surface 350 of the atomic object confinement apparatus 300. In various embodiments, at least a portion of the surface 350 of the atomic object confinement apparatus 300 comprises an oxide and/or electrically insulating layer 360, as shown in FIG. 4B. In various embodiments, the oxide and/or electrically insulating layer 360 is configured to electrically insulate the metamaterial structures, for example, of the signal manipulation elements (e.g., metamaterial arrays) formed and/or disposed on the surface 350 from the electrodes 310 of the atomic object confinement apparatus 300. For example, an oxide and/or electrically insulating layer 360 may be disposed and/or positioned between the signal manipulation element and other components of the atomic object confinement apparatus 300 (e.g. electrodes 310). In an example embodiment, an oxide film (e.g., an indium tin oxide) is used to coat a dielectric signal manipulation element. For example, the portions of the surface 350 on which the signal manipulation elements are formed and/or disposed may comprise an oxide and/or electrically insulating layer 360. In various embodiments, the oxide and/or electrically insulating layer 360 is a thin layer (e.g., approximately 10-30 nm thick or approximately 20 nm thick in a direction that is substantially perpendicular to a plane defined by the surface 350) of indium tin oxide or another oxide or electrically insulating material. In an example embodiment, a ground conductor 365 may be configured to enable electrical communication between a signal manipulation element (e.g., the metamaterial structures of a metamaterial array) to a ground of the atomic object confinement apparatus 300 to prevent a build-up of charge on the metamaterial structures. For example, the atomic object confinement apparatus 300 and the metamaterial structures of the metamaterial arrays formed and/or disposed on the surface 350 of the atomic object confinement apparatus 300 have a common ground, in an example embodiment. In an example embodiment, the oxide and/or electrically insulating layer 360 acts as the ground conductor 365. In an example embodiment, the signal manipulation element is in contact with a conducting layer of the atomic object confinement apparatus (e.g., of the first substrate).

As described above, in various embodiments, a plurality of signal manipulation elements are associated with and/or correspond to a respective atomic object position. For example, each signal manipulation element may be configured for performing one or more functions of the quantum computer. As a metamaterial structure is configured to be used with signals and/or electromagnetic waves of a particular wavelength or in a particular wavelength range, functions of the quantum computer that use different wavelength signals require the use of different signal manipulation elements, in various embodiments.

Figure 5:
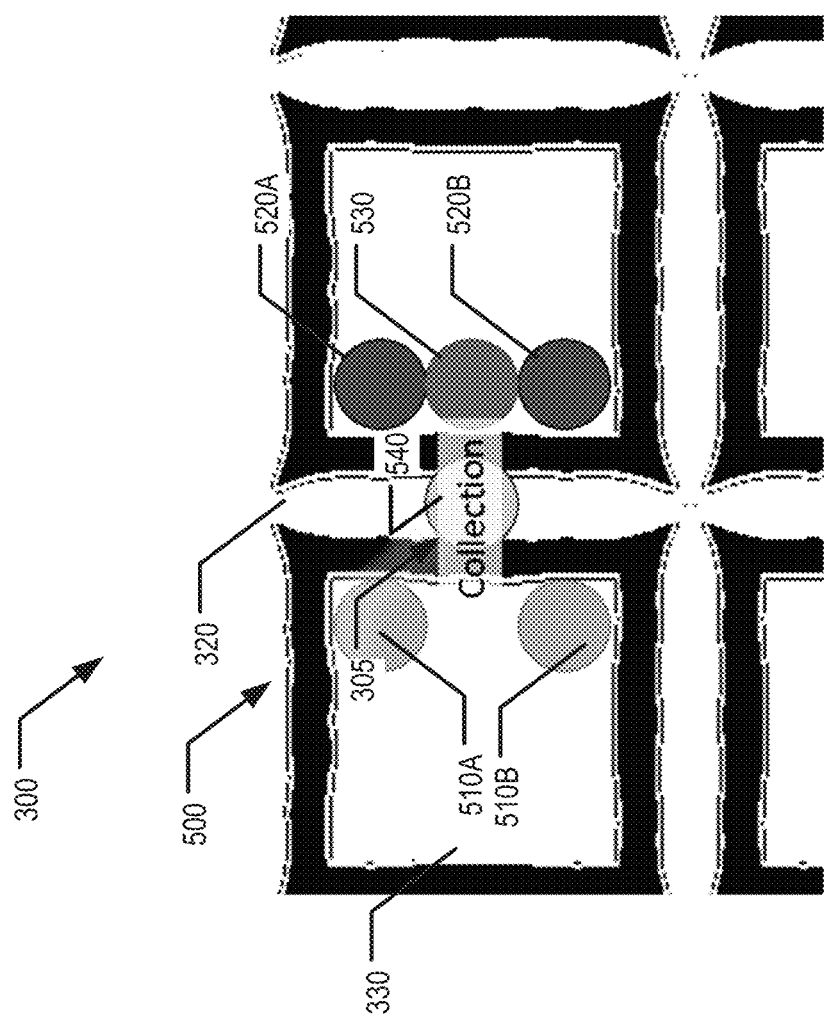
FIG. 5 is a schematic diagram of a portion of a surface of an atomic object confinement apparatus comprising an arrangement of signal manipulation elements on a surface thereof, according to an example embodiment.

FIG. 5 illustrates an example arrangement 500 of signal manipulation elements for a corresponding atomic object position 305 of the atomic object confinement apparatus 300. Each signal manipulation element in the arrangements of signal manipulation elements corresponds to a common atomic object position 305. The embodiment illustrated in FIG. 5 includes a plurality of action arrays 400 (e.g., 510A, 510B, 520A, 520B, 530) that are formed and/or disposed on islands 330 adjacent to the corresponding atomic object position 305. The embodiment illustrated in FIG. 5 further includes a collection array 540 that is formed and/or disposed on an atomic object path 320 that extends beneath the corresponding atomic object position 305. For example, the collection array 540 may be substantially located between the corresponding atomic object position 305 and the surface 350 of the atomic object confinement apparatus 300.

The plurality of action arrays 440 include two qubit gate arrays 510A, 510B. In various embodiments, the two qubit gate arrays 510A, 510B are configured to be used to perform a two qubit gate function of the quantum computer. The two qubit gate arrays 510A, 510B are configured to receive incoming signals that are configured to perform a two qubit gate for two or more atomic objects located at the corresponding atomic object position 305 and emit corresponding induced action signals toward and/or focused at the corresponding atomic object position 305. In various embodiments, a first two qubit gate array 510A is configured to have incident thereon an incoming signal of a first wavelength and to emit an induced action signal corresponding to the first wavelength (e.g., substantially equal to the first wavelength, in an example embodiment) and a second two qubit gate array 510B is configured to have incident thereon an incoming signal of a second wavelength and to emit an induced action signal corresponding to the second wavelength (e.g., substantially equal to the second wavelength, in an example embodiment). In an example embodiment, the first and second wavelengths are not equal to one another. In an example embodiment, the first and second wavelengths are substantially equal to one another. For example, in an example embodiment, the first and second wavelengths correspond to frequencies that are separated from one another by less than 15 GHz (e.g., approximately 12.64 GHz).

In an example embodiment, the two qubit gate arrays 510A, 510B are further configured to be used to perform a shelving function of the quantum computer. For example, in an example embodiment, the two qubit gate arrays 510A, 510B are configured to receive incoming signals that are configured to perform a shelving function for an atomic object located at the corresponding atomic object position 305 and emit corresponding induced action signals toward and/or focused at the corresponding atomic object position 305.

The plurality of action arrays 440 further include cooling arrays 520A, 520B. In various embodiments, the cooling arrays 520A, 520B are configured to receive incoming signals that are configured to perform cooling (e.g., sympathetic cooling) of the atomic object or atomic object crystals (e.g., groups of atomic objects) located at the corresponding atomic object position. The cooling arrays 520A, 520B are further configured to emit induced cooling signals corresponding to the incoming signals incident on the cooling arrays 520A, 520B such that the induced cooling signals are emitted toward and/or focus at the atomic object position 305. In various embodiments, a first cooling array 520A is configured to have incident thereon an incoming signal of a third wavelength and to emit an induced action signal corresponding to the third wavelength (e.g., substantially equal to the third wavelength, in an example embodiment) and a second cooling array 520B is configured to have incident thereon an incoming signal of a fourth wavelength and to emit an induced action signal corresponding to the fourth wavelength (e.g., substantially equal to the fourth wavelength, in an example embodiment). In an example embodiment, the third and fourth wavelengths are not equal to one another. For example, in an example embodiment, the third wavelength is 493 nm and the fourth wavelength is 650 nm.

The plurality of action arrays 440 further include a detection and/or single qubit gate array 530. In various embodiments, the detection and/or signal qubit gate array 530 is configured to receive incoming signals that are configured to perform a single qubit gate on an atomic object located at the corresponding atomic object position 305 and emit induced actions signals corresponding to the incident incoming signals toward and/or focused at the atomic object position 305. In various embodiments, the detection and/or signal qubit gate array 530 is configured to receive incoming signals that are configured to perform a detection or reading function (referred to as a reading function herein) on an atomic object located at the corresponding atomic object position 305 and emit induced actions signals corresponding to the incident incoming signals toward and/or focused at the atomic object position 305.

In the illustrated embodiment, the atomic object confinement apparatus 300 further comprises a collection array 520 corresponding to the atomic object position 305. In various embodiments, the collection array 520 is configured to receive emitted signals that are emitted by an atomic object located at the atomic object position (e.g., in response to an action signal configured to perform a reading function being incident on the atomic object). The collection array 540 is further configured to emit an induced collection signal responsive to the emitted signal being incident on the collection array. The collection array 540 is configured to emit the collection signal toward and/or focused at a collection position corresponding to the atomic object position 305.

Figure 6:
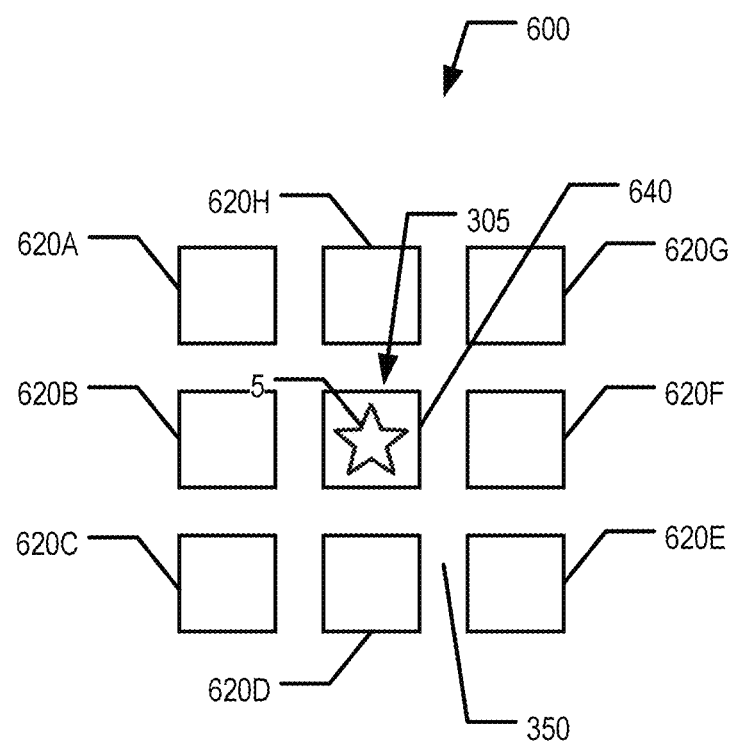
FIG. 6 is a schematic diagram of a portion of a surface of an atomic object confinement apparatus comprising another arrangement of meta-material arrays on a surface thereof, according to an example embodiment.

FIG. 6 another example arrangement 600 of signal manipulation elements on the surface 350 of the atomic object confinement apparatus 300. The arrangement 600 comprises a plurality of action arrays 620 (e.g., 620A-H) and a collection array 640. In an example embodiment, each of the action arrays 620 is configured for use for performing one or more functions of the quantum computer. For example, each action array 620 may be configured for use with a respective particular wavelength and/or respective particular wavelength range corresponding to the respective function(s). For example, each action array 620 may be configured to provide an action array that is focused in a particular manner, as described with more detail with respect to FIGS. 10A, 10B, and 10C. For example, an action array 620 may be configured to focus an induced action signal on the (entire) respective atomic object position and/or on one or more portions of the respective atomic object position. The particular focus characteristics of a respective action array 620 are configured based at least in part on the corresponding function(s) that the action array 620 is designed for use in performing.

Figure 7A:
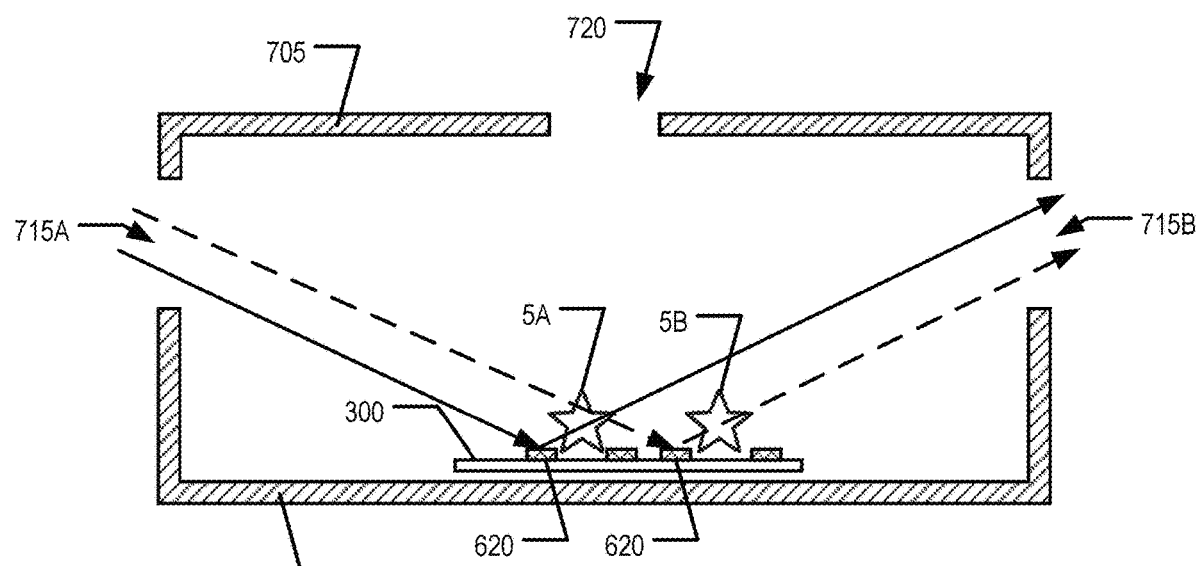
FIGS. 7A and 7B are each schematic diagrams illustrating the signals entering and/or exiting housing disposed at least partially around the atomic object confinement apparatus, according to various embodiments.
Figure 7B:
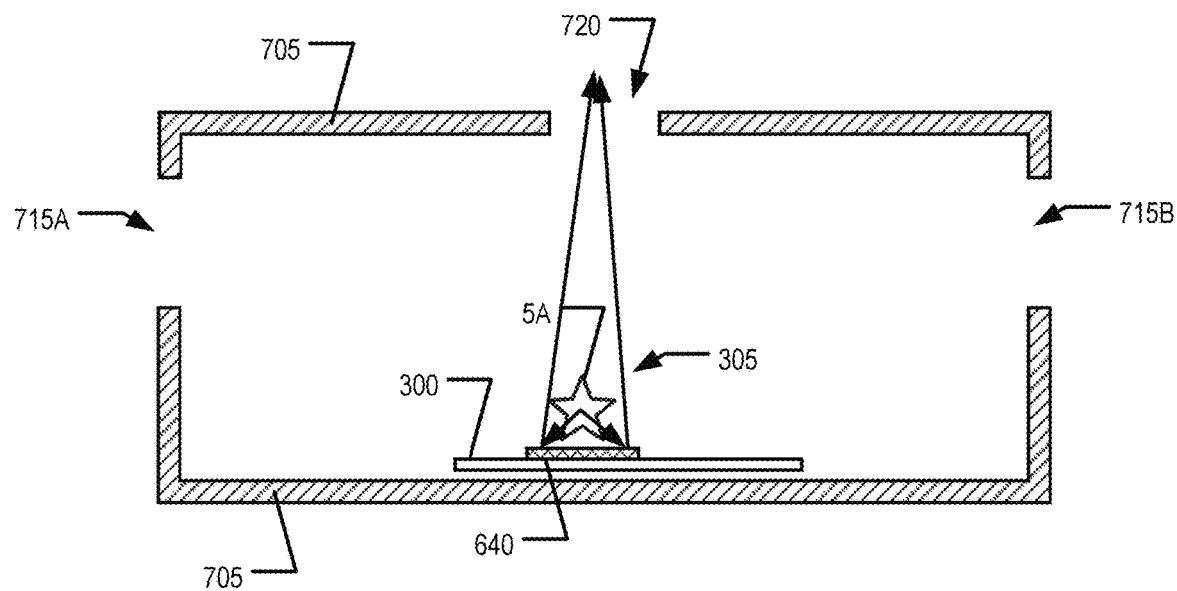

In various embodiments, the atomic object confinement apparatus 300 is located within a vacuum/cryogenic chamber, one or more radiation shields, and/or the like. For example, as shown in FIGS. 7A and 7B, the atomic object confinement apparatus 300 is disposed within some housing 705 (e.g., cryostat and/or vacuum chamber 40, radiation shields, and/or the like). The housing 705 comprises a plurality of windows, ports, and/or the like. For example, the manipulation signal windows 715 (e.g., 715A, 715B) are configured to enable manipulation signals 62 propagating transverse (e.g., at angle in a range between 20 and 70 degrees) to the plane of the surface of the atomic object confinement apparatus 300 to enter the housing 705. In an example embodiment, the manipulation signals are provided such that they form a 45 degree angle with the plane of the surface of the atomic object confinement apparatus 300. In other embodiments, various other elevation angles (e.g., in a range of 20 to 70 degrees, for example) of the manipulation signals may be used.

In various embodiments, the manipulating signal windows 715 and the action arrays 620 are configured such an action signal, after being incident on and/or passing through the respective atomic object position, exits the housing 705 through an opposite manipulation signal window 715. For example, in an example embodiment, a first manipulation signal enters the housing through manipulation signal window 715A, is incident on action array 620B, the resulting action signal pass through the respective atomic object position and exits the housing 705 through the opposite manipulation signal window 715B. Similarly, a second manipulation signal enters the housing through manipulation signal window 715B, is incident on action array 620F, the resulting action signal pass through the respective atomic object position and exits the housing 705 through the opposite manipulation signal window 715A. Thus, the number of windows or ports in the housing 705 can be reduced while enabling the action signals to exit the housing 705. For example, windows need not be added to the housing for the singular purpose of enabling the action signals to exit the housing. Such a configuration also prevents excess heating and/or reduces noise in the atomic object readings and action crosstalk caused by the action signals remaining within the housing 705 after being incident on and/or passing through the respective atomic object position 305.

In various embodiments, the housing 705 further comprises one or more collection windows 720. As shown in FIG. 7B, an emitted signal emitted by an atomic object 5A located at the atomic object position 305 is incident on the corresponding collection array 640. The induced collection signal is directed toward a collection window 720 of the housing 705. In various embodiments, the collection window 720 is aligned with the collection optics corresponding to the atomic object position 305. For example, the collection signal passes through the collection window 720 and is incident on the collection optics corresponding to the atomic object position 305 such that the collection signal is detected by the corresponding photodetector. The configuration of the manipulation signal windows 715, action arrays 620, collection windows 720, and the collection array 640 reduces the amount of light exiting the collection windows 720 that is generated through processes independent of an emitted signal generated by an atomic object 5.

FIG. 8 illustrates another example embodiment atomic object confinement apparatus 300 wherein signal manipulation elements 815 (e.g., action arrays 815A, 815B, and/or collection arrays 815C) are formed and/or disposed on the surface 350 of the atomic object confinement apparatus 300. The signal manipulation elements 815 are transparent signal manipulation elements. For example, the signal manipulation elements 815 are metasurface lenses, which are lenses or lens-like photonic metasurfaces formed by metamaterial arrays (e.g., a particularly arranged plurality of metamaterial structures). In the illustrated embodiment, the atomic object confinement apparatus 300 is formed on a first substrate 810. The first substrate 810 is transparent to light of various wavelengths, where the various wavelengths include wavelengths that may be used to perform one or more functions of the quantum computer and/or wavelengths of the emitted signal. For example, the first substrate 810 is transparent to light of various wavelengths that characterize respective manipulation signals used by the quantum computer, in an example embodiment. In an example embodiment, the first substrate 810 comprises waveguides, vias, and/or the like, that allow light to pass through the first substrate from a second surface 355 of the first substrate 810 to a first surface 350 of the first substrate 810, where the atomic object confinement apparatus 300 (e.g., electrodes 310) is formed on the first surface 350 of the atomic object confinement apparatus. In an example embodiment, the signal manipulation elements 815 are formed on the second surface 355 of the first substrate 810 and/or within the first substrate 810 (e.g., between the second surface 355 and the first surface 350).

For example, a manipulation signal 62 is provided to the atomic object confinement apparatus 300 via the second surface 355 of the first substrate 810. The manipulation signal 62 propagates through the first substrate 810 from the second surface 355 to the first surface 350 (e.g., through the bulk material of the first substrate 810, a waveguide, a via, and/or the like). The manipulation signal 62 is incident on the action array 815A. The action array 815A acts as a lens, resulting in the action signal 64 being incident on the atomic object 5 located at the atomic object position 305. In various embodiments, the action array 815A causes the action signal 64 to have a particular polarization, phase, beam profile (e.g., beam spot size at the atomic object position 305, intensity profile across the beam at the atomic object position, and/or the like). In an example embodiment, an area of the second surface 355 corresponding to the atomic object position 305 is illuminated with one or more manipulation signals and the action arrays perform chromatic filtering such that the appropriate action arrays are provided to the atomic object position 305 in an appropriate manner for the function to be performed.

For example, an emitted signal 72 emitted by the atomic object 5 located at the atomic object position 305 is incident on the collection array 815C. The collection array 815C acts as a lens and provides a focused and/or collimated collection signal 74 through the first substrate 810 from the first surface 350 to the second surface 355 thereof (e.g., through the bulk material of the first substrate 810, a waveguide, a via, and/or the like). The collection optics may be disposed proximate the second surface 355 of the first substrate 810 such that the collection signal 74 is incident on the collection optics corresponding to the atomic object position 305 to enable detection of the emitted signal.

FIG. 9 illustrates another configuration where a second substrate 910 having one or more signal manipulation elements 915 (e.g., 915A, 915B, 915C) formed and/or disposed thereon and/or therein is mounted in a secured relationship with respect to the atomic object confinement apparatus 300 such that manipulation signals can be provided to the atomic object positions 305 via respective signal manipulation elements 915 of the second substrate 910. For example, one or more action arrays 915A, 915B are formed and/or disposed on a first surface 950 of the second substrate 910, in an example embodiment. For example, one or more collection arrays 915C are formed and/or disposed on the first surface 950 of the second substrate 910, in an example embodiment. In an example embodiment, one or more action arrays 915A, 815B and/or collection array 915C are recessed and/or formed within the second substrate 910. The signal manipulation elements 915 are transparent signal manipulation elements. In an example embodiment, the signal manipulation elements 915 are formed on the second surface 955 of the second substrate 910 and/or within the second substrate 910 (e.g., between the second surface 955 and the first surface 950).

In various embodiments, the second substrate 910 is transparent to light of various wavelengths, where the various wavelengths include wavelengths that may be used to perform one or more functions of the quantum computer and/or wavelengths of the emitted signal. For example, the second substrate 910 is transparent to light of various wavelengths that characterize respective manipulation signals used by the quantum computer, in an example embodiment. In an example embodiment, the second substrate 910 comprises waveguides, vias, and/or the like, that allow light to pass through the second substrate from a second surface 955 of the second substrate 910 to a first surface 950 of the second substrate 810, where the first surface 950 of the second substrate 910 faces the atomic object confinement apparatus 300.

For example, manipulation signals are provided to the atomic object confinement apparatus 300 via the second surface 955 of the second substrate 910. The manipulation signals propagate through the second substrate 910 from the second surface 955 to the first surface 950 (e.g., through the bulk material of the second substrate 910, a waveguide, a via, and/or the like). The manipulation signals are incident on respective action arrays 915A, 915B. For example, the signal manipulation elements 915 are metasurface lenses, which are lenses or lens-like photonic metasurfaces formed by metamaterial arrays (e.g., a particularly arranged plurality of metamaterial structures). For example, the action arrays 915A, 915B act as lenses, resulting in the action signals being incident on the atomic object 5 located at the atomic object position 305. In various embodiments, the action arrays 915A, 915B cause the respective action signals to have respective particular polarizations, phases, beam profiles (e.g., beam spot size at the atomic object position 305, intensity profile across the beam at the atomic object position, and/or the like), and/or the like. Once the action signals are incident on and/or pass through the atomic object position 305, the action signals reflect off of the surface 350 of the atomic object confinement apparatus 300. In an example embodiment, an area of the second surface 955 corresponding to the atomic object position 305 is illuminated with one or more manipulation signals and the action arrays perform chromatic filtering such that the appropriate action arrays are provided to the atomic object position 305 in an appropriate manner for the function to be performed.

While not illustrated in FIG. 9 for the sake of clarity, the atomic object 5 located at the atomic object position 305 may emit an emitted signal. The emitted signal is incident on the collection array 915C. The collection array 915C acts as a lens and provides a focused and/or collimated collection signal through the second substrate 910 from the first surface 950 to the second surface 955 thereof (e.g., through the bulk material of the second substrate 910, a waveguide, a via, and/or the like). The collection optics may be disposed proximate the second surface 955 of the second substrate 910 such that the collection signal is incident on the collection optics corresponding to the atomic object position 305 to enable detection of the emitted signal.

In an example embodiment, the action arrays are disposed and/or formed on the second substrate 910, as shown in FIG. 9, and the collection arrays are disposed and/or formed on the first substrate 810 (e.g., on the surface 350 of the atomic object confinement apparatus 300), as shown in FIG. 8. In an example embodiment, the action arrays are disposed and/or formed on the first substrate 810 (e.g., on the surface 350 of atomic object confinement apparatus 300), as shown in FIG. 8, and the collection arrays are formed on the second substrate 910, as shown in FIG. 9. In another example embodiment, some of the action arrays are disposed and/or formed one the first substrate 810 and some of the action arrays are disposed and/or formed on the second substrate 910. For example, the first substrate 810 may be transparent to light characterized by wavelengths of a first wavelength range and the second substrate 910 may be transparent to light characterized by wavelengths of a second wavelength range. Action arrays (and/or other signal manipulation elements) corresponding to wavelengths in the first wavelength range may be formed and/or disposed on the first substrate 810 and action arrays (and/or other signal manipulation elements) corresponding to the wavelengths in the second wavelength range may be formed and/or disposed on the second substrate 910.

In various embodiments, the signal manipulation elements (e.g., action arrays) are configured to cause an action signal to be focused on the (entire) respective atomic object position and/or on one or more portions of the respective atomic object position. For example, FIGS. 10A, 10B, and 10C illustrate a group of four atomic objects 5A, 5B, 5C, and 5D located at atomic object position 305. For example, the group of atomic objects may be a four ion crystal, in an example embodiment. FIGS. 10A, 10B, and 10C each illustrate an example focus of an action signal by a respective signal manipulation element. In various embodiments, various signal manipulation elements may be configured to provide respective action arrays focused in one or more of the illustrated manners or in other manners.

FIG. 10A illustrates an example incoming signal 1062 (e.g., a manipulation signal) that is incident on a first signal manipulation element 1040A (e.g., an action array). The induced first action signal 1064A has a first beam profile 1068A. The first beam profile 1068A is controlled by the geometry of the metamaterial structures that form the first signal manipulation element 1040A. The first beam profile 1068A is configured such that the entire atomic object position 305 is illuminated by the first action signal 1064A. For example, the first beam profile 1068A is configured such that the first action signal 1064A is incident on all of the atomic objects 5A, 5B, 5C, 5D located at the atomic object position 305.

FIG. 10B illustrates an example incoming signal 1062 (e.g., a manipulation signal) that is incident on a second signal manipulation element 1040B (e.g., an action array). The induced second action signal 1064B has a second beam profile 1068B. The second beam profile 1068B is controlled by the geometry of the metamaterial structures that form the second signal manipulation element 1040B. The second beam profile 1068B is configured such that only one atomic object 5B located at atomic object position 305 is illuminated by the second action signal 1064B. For example, the second beam profile 1068B is configured such that the second action signal 1064B is incident on only a (known) portion of the atomic object position 305. This enables the second action signal 1064B to be incident on only one of the atomic objects 5B.

FIG. 10C illustrates an example incoming signal 1062 (e.g., a manipulation signal) that is incident on a third signal manipulation element 1040C (e.g., an action array). The third signal manipulation element 1040C is configured to provide two independently focused action signals (e.g., third action signal 1064C and fourth action signal 1064D). The induced third action signal 1064C has a third beam profile 1068C. The induced fourth action signal 1064D has a fourth beam profile 1068D. The third beam profile 1068C and the fourth beam profile 1068D are controlled by the geometry of the metamaterial structures that form the third signal manipulation element 1040C. The third beam profile 1068C is configured such that only one atomic object 5B located at atomic object position 305 is illuminated by the third action signal 1064C. For example, the third beam profile 1068C is configured such that the third action signal 1064C is incident on only a (known) portion of the atomic object position 305. The fourth beam profile 1068D is configured such that only one atomic object 5C located at atomic object position 305 is illuminated by the fourth action signal 1064D. For example, the fourth beam profile 1068D is configured such that the fourth action signal 1064D is incident on only a (known) portion of the atomic object position 305. This enables the third action signal 1064C to be incident on only one of the atomic objects 5B and the fourth action signal 1064D to be incident on only one of the atomic objects 5C. In an example embodiment, the third and fourth action signals 1064C, 1064D may have different characteristics (e.g., different intensities, polarizations, phases, and/or the like) or similar characteristics (e.g., similar intensities, polarizations, phases, and/or the like).

Thus, as illustrated by FIGS. 10A, 10B, and 10C, the signal manipulation elements may be configured to provide induced action signals that have desired characteristics and that are incident on the entire corresponding atomic object position and/or one or more portions of the atomic object position.

In various embodiments, the signal management system defines and/or provides optical paths that enable the manipulation signals 62 to be provided to the action arrays formed on the first substrate (e.g., on the surface 350 of the atomic object confinement apparatus 300) and/or on a second substrate mounted in a secured position with respect to the atomic object confinement apparatus 300.

In various embodiments, the signal management system of the quantum computer 110 comprises optical elements configured to define optical paths 66 from the manipulation sources 60 to the corresponding signal manipulation elements (e.g., formed and/or disposed on the first substrate of the atomic object confinement apparatus or a second substrate). In various embodiments, the quantum computer 110 comprises collection optics configured to provide a collection signal to a corresponding photodetector (e.g., photodiode, photomultiplier tube, charge-coupled device (CCD) sensor, complementary metal-oxide-semiconductor (CMOS) sensor, and/or other photodetector) for measuring, detecting, capturing, and/or the like of the collection signal.

FIG. 11 provides a notional diagram of an example optical assembly 1100 configured to provide manipulation signals to and/or to receive collection signals from signal manipulation elements on a surface 350 of an atomic object confinement apparatus 300 and/or on a second substrate 910, according to various embodiments. The optical assembly 1100 comprises a plurality of incoming fibers 1115, which is an optical fiber configured to provide manipulation signals generated by manipulation sources 60 such that the manipulation signals may be provided to appropriate action arrays associated with the atomic object confinement apparatus 300.

For example, an incoming fiber 1115 delivers a manipulation signal generated by a manipulation source 60 to an incoming lens 1110 (or lens assembly) configured to focus the manipulation signal onto a corresponding action array as an incoming signal 62. In an example embodiment, the incoming lens 1110 focusses the manipulation signal onto a general area that corresponds to a respective atomic object confinement apparatus such that the manipulation signal is incident on more than one signal manipulation element associated with the atomic object position. The chromatic filtering performed by the signal manipulation elements causes the appropriate signal manipulation element to be induced to provide the appropriate action signal. The other signal manipulation elements upon which the manipulation signal is incident do not provide corresponding action signals as they are not configured to respond to the wavelength of the manipulation signal.

The illustrated optical assembly 1100 further comprises at least one collection fiber 425, which is an optical fiber configured to provide a collection signal from a collection position 445 to a corresponding photodetector 450. In various embodiments, a collection lens 420 (and/or lens assembly) is disposed at a collection position 445 such that a collection signal 74 corresponding to an emitted signal 72 emitted by an atomic object located at a corresponding atomic object position 305 is incident on and/or focused on the collection lens 420 due to interaction of the emitted signal 72 with a respective collection array. The collection lens 420 directs and/or focuses the collection signal into a corresponding collection fiber 425. The collection fiber 425 provides the collection signal to a corresponding photodetector 450, as shown in FIG. 4B, such that the photodetector 450 may generate an electric signal indicative of the optical collection signal. The electric signal indicative of the optical collection signal may then be provided to the controller 30 of the quantum computer 110 for processing, analysis, storage in memory, and/or the like (e.g., via analog-digital (A/D) converter 1625, in an example embodiment).

In various embodiments, the incoming fibers 1115 and collection fibers 425 are arranged in one or more fiber blocks such that the fibers are spaced apart by a fiber spacing β. In various embodiments, the fiber spacing β is determined based on the fiber cladding of the incoming fibers 1115 and/or collection fibers 425. In an example embodiment, the fiber spacing β is a range of 50 to 200 µm (e.g., approximately 125 µm).

In an example embodiment, the incoming lenses 1110 and/or collection lenses 420 have a focal length f of approximately 1.5 mm, a collimated beam waist w of the beam formed by the lenses 1115, 415 of approximately 56 µm, and a Rayleigh range $Z_r$ of the beam formed by the lenses 1115, 415 of approximately 18.5 mm.

In various embodiments, the incoming lenses 1110 and/or collection lenses 420 are DOEs and/or transmissive metamaterial arrays configured to act as lenses.

FIG. 12 provides a notional illustration of a cross-section of a portion of an optical assembly 1200 configured to deliver incoming signals to signal manipulation elements associated with an atomic object confinement apparatus 300 and/or to receive collection signals from signal manipulation elements associated with the atomic object confinement apparatus. The atomic object confinement apparatus 300 is located within a cryostat and/or vacuum chamber 40 having an optical access window 45 (e.g., manipulation signal window 715, collection window 720). Manipulation signals are generated by manipulation sources 60 and provided along optical paths 66. In the embodiment illustrated in FIG. 12, the optical paths 66 comprise one or more optical fibers of the one or more fiber pigtails 1220. The optical fibers provide the manipulation signals to a distribution and positioning optical element 1210 configured to divide a manipulation signal into multiple manipulation signals, direct a manipulation signal so that the resulting incoming signal is incident on the appropriate signal manipulation element, and/or the like. In an example embodiment, the distribution and positioning optical element 1210 is a five axis positioner configured to accurately position the end of optical fibers in an optical fiber array (e.g., provided to the five axis positioner by one or more fiber pigtails 1220). In an example embodiment, the distribution and positioning optical element 1210 comprises one or more modulators, waveguides, beam splitters (e.g., comprising DOEs and/or metamaterial arrays), lenses (e.g., incoming lenses 1110 and/or collection lenses 420), double-layer metamaterial array beam splitter 1300, photonic integrated circuit (PIC) 1400, and/or the like. In an example embodiment, free-space optical elements such as one or more acoustic optic modulators (AOMs) and/or one or more electro-optic deflectors could enable time division multiplexing of manipulation signals, which would reduce laser power requirements. In various embodiments, the operation of the modulators, PIC 1400, and/or the like is controlled by the controller 30.

At least a portion of a manipulation signal exits the distribution and positioning element 1210 as an incoming signal and propagates through the optical access window 45 (e.g., manipulation signal window 715) to be incident on the appropriate action array 400. The distribution and positioning optical element 1210 may also include collection optics such as a collection lens 420 configured to have a collection signal incident thereon and to focus the collection signal into an optical fiber of one of the fiber pigtails 1220. The optical fiber may then deliver the collection signal to a photodetector.

In an example embodiment, one manipulation source 60 may provide one manipulation signal that is split into multiple manipulation signals that are provided to action arrays corresponding to various atomic object positions 305 of the atomic object confinement apparatus 300. Thus, the optical paths defined by the beam management system comprise one or more beam splitters in various embodiments. FIG. 13 illustrates an example embodiment of a double-layer metamaterial array beam splitter 1300. One or more double-layer metamaterial array beam splitters 1300 may be included in a distribution and positioning optical element 1210 and/or otherwise used to form and/or define one or more beam paths configured to provide manipulation signals to respective action arrays associated with an atomic object confinement apparatus 300.

The beam splitter 1300 comprises a beam splitter substrate 1330. The substrate 1330 comprises material 1336 that is transparent to at least light of a splitting wavelength, wherein the beam splitter 1300 is configured to split an optical signal of light characterized by the splitting wavelength. A splitting metamaterial array 1310 is formed and/or disposed on a first surface 1332 of the beam splitter substrate 1330. The splitting metamaterial array 1310 is configured to provide two or more signals 92 (e.g., 92A-C) in response to an optical signal 90 of the splitting wavelength being incident thereon. For example, the splitting metamaterial array 1310 is configured to form two or more signals 92 (e.g., three in the illustrated embodiment) that are directed in different directions through the beam splitter substrate 1330. For example, the splitting metamaterial array 1310 is configured to provide two or more signals 92 that are directed to and/or focused on respective locations on a second surface 1334 of the beam splitter substrate 1330. The splitting metamaterial array 1310 controls the portion of the incoming optical power of the optical signal 90 that is provided to each of the two or more signals 92. The splitting metamaterial array 1310 further controls the positioning of the respective locations on the second surface 1334.

Collimating metamaterial arrays 1320 (e.g., 1320A, 1320B, 1320C) are formed and/or disposed at the respective locations on the second surface 1334 of the beam splitter substrate 1330. The collimating metamaterial arrays 1320 are configured to provide respective collimated signals 94 (e.g., 94A-C) responsive to the respective signals 92 being incident thereon. For example, each of the collimated signals 94 may be coupled into a respective optical fiber, provided via free-space and/or bulk optics, and/or the like to a target location. In various embodiments, the collimating metamaterial arrays 1320 may be configured to focus the respective collimated signals 94. In an example embodiment, the collimating arrays 1320 are configured to focus, direct (e.g., change the outgoing angle), and/or collimate respective collimated signals 94. In an example embodiment, the beam splitter 1300 is configured such when the collimated signals 94 exit the beam splitter 1300 via the collimating metamaterial arrays 1320, the collimated signals 94 are propagating toward respective action arrays associated with the atomic object confinement apparatus 300.

In various embodiments, the splitting metamaterial array 1310 and/or the collimating metamaterial arrays 1320 are configured to perform chromatic filtering of the incoming optical signal such that the collimated signals 94 are characterized by a desired wavelength (e.g., the splitting wavelength) and/or frequency range and/or profile (e.g., including a frequency corresponding to the splitting wavelength).

In various embodiments, the splitting metamaterial array 1310 and/or the collimating metamaterial arrays 1320 are configured to control the polarization and/or phase of the respective collimated signals 94.

In an example embodiment, a PIC 1400 is used to generate a plurality of manipulation signals (e.g., from a manipulation signal generated by a manipulation source 60) and to provide the plurality of manipulation signals to respective action arrays associated with respective atomic object positions 305 of an atomic object confinement apparatus 300. FIG. 14A illustrates a face-on view of an example PIC 1400 that may be used to provide manipulation signals to respective action arrays. FIG. 14B illustrates a side view of the PIC 1400 where the PIC 1400 is used in coordination with bulk optical elements (e.g., lens 1440) to provide the manipulation signals to the respective action arrays. FIG. 14C illustrates a side view of the PIC 1400 where metamaterial arrays 1450 are formed and/or disposed in the output windows 1410 of the PIC 1400 such that external optical components are not required for providing the manipulation signals to the respective action arrays.

In various embodiments, one or more manipulations signals generated by one or more manipulation sources 60 are provided to the PIC 400 via respective optical fibers 1420. The PIC 1400 splits and/or modifies (modifies the amplitude, modulates, and/or the like) the manipulations signals as appropriate for the application. The PIC 1400 then provides appropriately conditioned signals through respective optical windows 1410.

As shown in FIG. 14B, in various embodiments, external and/or bulk optics, such as lens 1440 to collimate and/or focus the signals exiting the optical windows 1410 of the PIC 1400 and direct the signals toward respective action arrays associated with respective atomic object positions 305 of the atomic object confinement apparatus 300.

As shown in FIG. 14C, in various embodiments, transmissive metamaterial arrays 1450 are disposed and/or formed in the optical windows 1410. the metamaterial arrays 1450 are configured to collimate and/or focus the signals exiting the optical windows 1410 of the PIC 1400 and direct the signals toward respective action arrays associated with respective atomic object positions 305 of the atomic object confinement apparatus 300.

Example Alignment of Beam Management System

In various embodiments, an alignment process is performed to align one or more optical beam paths with corresponding locations (e.g., action arrays and/or other signal manipulation elements) such that the action signals are appropriately delivered to the respective atomic object positions 305. There are six degrees of freedom for alignment—two degrees of freedom relating to tilt in two independent directions that are parallel to a plane defined to be substantially perpendicular to the direction of propagation of the incoming manipulation signal, one degree of freedom relating to rotation about an axis that is substantially parallel to the direction of propagation of the incoming manipulation signal, two translational degrees of freedom relating to displacement in two independent directions that are parallel to the plane defined to be substantially perpendicular to the direction of propagation of the incoming manipulation signal, and one translational degree of freedom relating to displacement in a direction substantially parallel to the direction of propagation of the incoming manipulation signal.

In various embodiments, an alignment arrangement of signal manipulation elements is provided that enables the deviation from the ideal alignment in one or more degrees of freedom to be determined. Using a high-speed feedback loop, measurements captured using the alignment arrangement of signal manipulation elements can be processed and a mechanical fine adjustment mechanism (e.g., a piezoelectric fine adjustment device) can be controlled to adjust the alignment of the optical paths with respect signal manipulation elements associated with the atomic object confinement apparatus 300 to achieve appropriate alignment and to correct for vibrational noise. In an example embodiment, the controller 30 is configured to receive the measurements captured using the alignment arrangement of signal manipulation elements, process those measurements, and control the mechanical fine adjustment mechanism.

As should be understood, various embodiments of an alignment arrangement of signal manipulation elements may be used in QCCD-based quantum computing applications and in various other applications where alignment of different components is required and/or desired. For example, various embodiments of an alignment arrangement may be used in the precise alignment of optics on a surface, alignment of two surfaces relative to each other (even without a specific need of optics, the optics could be used solely to ensure relative alignment), one surface relative to a fixed surface, and/or other precise alignment applications.

In various embodiments, the alignment arrangement is formed on the surface 350 of the atomic object confinement apparatus 300 and/or on the first or second surface 950, 955 of the second substrate 910. In an example embodiment, multiple alignment arrangements are formed on the surface 350 of the atomic object confinement apparatus 300 and/or on the first or second surface 950, 955 of the second substrate 910. For example, an alignment arrangement may correspond to a particular optical access window 45 (e.g., manipulation signal window 715, collection window 720). In an example embodiment, an alignment arrangement is provided for each optical access window 45. In various embodiments, one or more detectors configured to capture and/or measure the light reflected from or transmitted through the alignment arrangement may be located outside of the housing 705 and/or outside of the cryostat and/or vacuum chamber. The detectors may then provide respective electrical signals indicative of the respective captured optical signals to the controller 30 (e.g., via A/D converter 1625) for processing.

In various embodiments, an alignment arrangement comprises one or more signal manipulation elements configured to detect the alignment or displacement from appropriate alignment with respect to rotation about an axis that is substantially parallel to the direction of propagation of the incoming signal, referred to herein as rotational alignment signal manipulation elements. For a linearly polarized incoming signal, rotation of the source is the same as rotation of the polarization of the incoming signal. In various embodiments, a rotational alignment signal manipulation element is a uniform photonic metasurface (e.g., with no imposed gradient) with a sharp resonant peak (e.g., antisymmetric resonance, Fano resonance, bound states in the continuum (BIC) resonance, quasi-BIC resonance, and/or the like) that is highly sensitive to incident polarization such that the forward-propagating amplitude is modulated based on the polarization of the incoming signal. In various embodiments, the rotational alignment signal manipulation element is configured so that a desired polarization of the incoming signal is on resonant and a nominal rotation of the polarization is slightly off resonance. For example, the rotational alignment signal manipulation element is configured so that a positive rotation would approach resonance and a negative rotation would move further from resonance (or vice versa). As the derivative of the resonant response is maximized on the side of the resonant peak, such a rotational alignment signal manipulation element provides a highly sensitive measurement of the rotational alignment of the incoming signal optical path with respect to the rotational alignment signal manipulation element. In an example embodiment, the rotation alignment signal manipulation element uses an electric or magnetic dipole resonance.

In an example embodiment, an alignment arrangement comprises two rotational alignment signal manipulation elements. For example, a first rotational alignment signal manipulation element may be tuned so that nominal alignment corresponds to the center of the response peak and a second rotational alignment signal manipulation element may be tuned to maximize sensitivity and provide information about the rotation direction. For example, nominal alignment for the second rotational alignment signal manipulation element may be approximately half way up the response peak. The first rotational alignment signal manipulation element may be used for an initial alignment and the second rotation alignment signal manipulation element may be used for fine-tuning the alignment, performing real-time adjustments to the alignment, and/or the like.

In various embodiments, an alignment arrangement comprises one or more signal manipulation elements configured to detect the alignment or displacement from appropriate alignment with respect to tilt along two independent directions that are substantially parallel to the plane defined by the surface 350 of the atomic object confinement apparatus 300, referred to herein as tilt alignment signal manipulation elements. In various embodiments, a tilt alignment signal manipulation element is a uniform photonic metasurface (e.g., with no imposed gradient) with a sharp resonant peak (e.g., antisymmetric resonance, Fano resonance, BIC resonance, quasi-BIC resonance, and/or the like) that is highly sensitive to the angle of incidence of the incoming signal such that the forward-propagating amplitude is modulated based on the angle of incidence of the incoming signal. In various embodiments, the tilt alignment signal manipulation element is configured so that a desired angle of incidence of the incoming signal is on resonant and a nominal tilt away from the desired angle of incidence is slightly off resonance. For example, in an example embodiment, the tilt alignment signal manipulation element is configured so that a positive tilt would approach resonance and a negative tilt would move further from resonance (or vice versa). In an example embodiment, the alignment arrangement comprises at least one signal manipulation element for each degree of tilt. In various embodiments, the tilt alignment signal manipulation element(s) have an asymmetric response to the two degrees of tilt.

In an example embodiment, an alignment arrangement comprises two tilt alignment signal manipulation elements per tilt direction. For example, a first tilt alignment signal manipulation element may be tuned so that nominal alignment corresponds to the center of the response peak and a second tilt alignment signal manipulation element may be tuned to maximize sensitivity and provide information about the tilt direction. For example, nominal alignment for the second tilt alignment signal manipulation element may be approximately half way up the response peak. The first tilt alignment signal manipulation element may be used for an initial alignment and the second tilt alignment signal manipulation element may be used for fine-tuning the alignment, performing real-time adjustments to the alignment, and/or the like.

In various embodiments, an alignment arrangement comprises one or more signal manipulation elements configured to detect the alignment or displacement from appropriate alignment with respect to the translational displacement along a direction that is substantially perpendicular to the plane defined by the surface 350 of the atomic object confinement apparatus 300, referred to herein as perpendicular translation alignment signal manipulation elements. In various embodiments, a perpendicular translation alignment signal manipulation element is a high numerical aperture metamaterial lens. When a non-collimated signal is incident on the perpendicular translation alignment signal manipulation element, the diameter of the outgoing beam is measured at a plane past the focal point. The measured diameter of the outgoing beam indicates the displacement of the signal releasing optic of the corresponding optical path.

In an example embodiment, the alignment arrangement comprises a lateral displacement element 1500 comprising a set of scattering elements, as illustrated in FIG. 15A, that are configured for measuring the alignment of the optical path with respect to translation in the two directions that are substantially parallel to the plane defined by the surface 350 of the atomic object confinement apparatus. FIG. 15A illustrates a pattern 1505 of scattering elements 1510 (e.g., 1510A, 1510B, 1510C). An incoming signal 1520, in the form of an optical vortex is provided. In various embodiments, the incoming signal is formed through manipulation of the orbital angular momentum of the light. An optical vortex has a zero-amplitude singularity at its center (e.g., the amplitude of the signal forms an annular structure, as illustrated in FIG. 15A). A first scatterer 1510A is, when appropriate parallel translational alignment is achieved, aligned with the zero-amplitude singularity at the center of the optical vortex. A second scatterer 1510B is, when appropriate parallel translational alignment is achieved, partially illuminated on the outward edge of the incoming signal 1520 ring, displaced in a first-direction from the first scatterer 1510A. A third scatterer 1510C is, when appropriate parallel translational alignment is achieved, partially illuminated on the outward edge of the incoming signal 1520 ring, displaced in a second-direction from the first scatterer 1510A. Brightness of the first-direction displaced scatterer 1510B would indicate magnitude and direction of first-direction displacement, brightness of the second-direction displaced scatterer 1510C would indicate magnitude and direction of second-direction displacement, and nominal displacement alignment would be characterized by minimizing brightness of the central scatterer 1510A. This configuration minimizes scattered light as well as footprint by requiring only three scattering elements. An optical vortex can be generated by a metamaterial array or DOE, possibly integrated with either the external PIC 1400 or double-metamaterial array beam splitter 1300. In an example embodiment, a Gaussian beam is used as the incoming signal 1520.

In another example embodiment, the alignment arrangement comprises a lateral displacement element 1550 comprising rows 1535 (e.g., 1535A, 1535B) of scattering elements 1530 (e.g., 1530A, 1530B, 1530C, 1530D), as illustrated in FIG. 15B, that are configured for measuring the alignment of the optical path with respect to translation in the two directions that are substantially parallel to the plane defined by the surface 350 of the atomic object confinement apparatus. The incoming signal is in the form of an interference pattern comprising dark fringes 1540 (e.g., 1540A, 1540B, 1540C) and bright fringes 1545 (e.g., 1545A, 1545B). When appropriate parallel translational alignment is achieved, a first row 1535A is aligned along the edge of a bright fringe 1545A (e.g., providing a 50% brightness reflection), a second row 1530B is nominally aligned with the center of a dark fringe 1540B. Imaging of the scattering elements 1530 provides a characterization of the total intensity of light incident on the rows 1535 of scattering elements 1530. Lateral displacement would result in brightening or darkening of each row 1535. Nominal alignment would result in minimal scattering intensity for the row aligned with a dark fringe 1540. The amplitude of scattering for the partially-illuminated row (e.g., row 1535A) would indicate the direction of misalignment. A second set of rows of scatterers and a second incoming signal in the form of a interference pattern comprising dark and bright fringes would be used for determining the displacement in a second (independent) direction that is also substantially parallel to the plane defined by the surface 350 of the atomic object confinement apparatus 300.

In various embodiments, use of a lateral displacement element 1500, 1550 comprises spatial filtering of the detected signal (e.g., the reflect/scattered signal due to the incident beam being incident on the lateral displacement element). In an example embodiment the spatial filtering is performed by imaging the scatterers on the focal plane of a camera. Various other techniques for spatial filtering of a detected optical signal may be used in various other embodiments.

In an example embodiment, the alignment arrangement comprises a single photonic metasurface lens configured to simultaneously characterize all six degrees of freedom. For example, the alignment arrangement may comprise or consist of a multi-degree alignment metamaterial array. The multi-degree alignment metamaterial array is configured such that misalignment of tile would cause elongation of the focal shape and/or shift an outgoing angle of a beam that results from an incoming signal being incident on the multi-degree alignment metamaterial array. For example, the edges of the multi-degree alignment metamaterial array may be configured to provide aberration to a beam that results from an incoming signal being incident on the multi-degree alignment metamaterial array that indicates the lateral displacement of the incoming signal. For example, a diffraction grating surrounding the multi-degree alignment metamaterial array would provide characteristic fringes if illuminated (e.g., by the incoming signal being not properly aligned with the multi-degree alignment metamaterial array). For example, the multi-degree alignment metamaterial array may be configured with separate optical function for orthogonal linear polarizations to measure rotational misalignment. For instance, first-direction linearly-polarized light would be focused and deflected at an angle of theta, while second-direction linearly-polarized light would be focused and deflected at an angle of negative theta. Comparing the amplitudes of the two focal points would indicate the fractional intensity of both incident polarizations such that the rotational alignment or misalignment may be determined.

In an example embodiment, a multi-degree alignment metamaterial array is used for initial alignment of the optical paths of the beam management system with corresponding action arrays associated with the atomic object confinement apparatus 300. One or more rotational alignment signal manipulation elements, tilt alignment signal manipulation elements, perpendicular translation alignment signal manipulation elements, and/or sets/rows of scattering elements are used to perform fine-alignment and/or real-time correction of alignment of optical paths of the beam management system with corresponding action arrays associated with the atomic object confinement apparatus 300.

Technical Advantages

Various embodiments provide technical solutions to the accurate and efficient delivery of manipulation signals to atomic objects confined by an atomic object confinement apparatus and/or collecting indications of emitted signals emitted by atomic objects confined by the atomic object confinement apparatus. These various solutions are scalable to provide signal delivery and/or collection for large one or multi-dimensional (e.g., two-dimensional) atomic object confinement apparatuses. For example, in various embodiments, In particular, manipulation signals are sent transverse (e.g., approximately perpendicular) to a plane defined by the surface 350 of the atomic object confinement apparatus 300. For example, the manipulation signals are sent such that they are incident on a signal manipulation element and induce the metamaterial structures of the array to emit an action signal that is focused on the corresponding atomic object positions. In another example, emitted signals emitted by an atomic object located at an atomic object position are incident on a signal manipulation element formed and/or disposed on the surface 350 and an induced collection signal is emitted out of the plane defined by the surface 350 toward a respective collection position.

As the angle of incidence of an incoming signal or an emitted signal onto a signal manipulation element is not as important for the pointing of the emitted induced action signal or collection signal, respectively, the system is robust to a fair amount of beam jitter. For example, as noted above, an action array may have a diameter that is one to seven times the diameter of the beam of an incoming signal. As long as at least a portion of the incoming signal providing a sufficient energy flux for performance of the corresponding function of the quantum computer is incident on the action array, the action array will be induced to emit an action signal toward and/or focused at the respective atomic object position for performing the corresponding function.

Moreover, because the signal manipulation elements are formed and/or disposed on the surface 350 of the atomic object confinement apparatus 300, motion of the atomic object confinement apparatus 300 will not lead to a beam point error. Rather, movement of the atomic object confinement apparatus may result in a minor amplitude error that can be compensated for through a calibration of the manipulation signal power.

Additionally, various embodiments enable the use of lower power manipulation signals. For example, in an example conventional configuration, a linear four ion crystal is used with the qubit ions located on the ends of the linear crystal (e.g., with two sympathetic cooling ions located between the qubit ions) and the qubit ions are separated by approximately 8 microns. In order to illuminate both of the qubit ions, a large spot size manipulation signal (e.g., approximately 17 microns in radius) is used to illuminate both qubit ions. However, this requires a relatively high power manipulation signal (e.g., approximately 50 mW). The metasurfaces of various embodiments make it possible to focus a single manipulation signal into two spots, each having a spot size of a few microns, that are separated by the required distance (e.g., approximately 8 microns). This enables a significant reduction in the required power of the manipulation signal. For example, in various embodiments, the required power of the manipulation signal is reduced by more than a factor of ten.

Various embodiments further provide efficient techniques for defining optical paths and/or providing incoming signals to the action arrays and aligning the optical paths with the respective action arrays.

Thus, various embodiments provide technical improvements to the technical field of providing manipulation signals to and collecting indications of emitted signals from atomic objects confined by an atomic object confinement apparatus.

Exemplary Controller

In various embodiments, an atomic object confinement apparatus confinement apparatus 300 is incorporated into a system (e.g., a quantum computer 110) comprising a controller 30. In various embodiments, the controller 30 is configured to control various elements of the system (e.g., quantum computer 110). For example, the controller 30 may be configured to control the voltage sources 50, a cryostat system and/or vacuum system controlling the temperature and pressure within the cryostat and/or vacuum chamber 40, manipulation sources 60, cooling system, and/or other systems controlling the environmental conditions (e.g., temperature, humidity, pressure, and/or the like) within the cryostat and/or vacuum chamber 40 and/or configured to manipulate and/or cause a controlled evolution of quantum states of one or more atomic objects confined by the atomic object confinement apparatus 300. In various embodiments, the controller 30 may be configured to receive signals from one or more optics collection systems.

As shown in FIG. 16, in various embodiments, the controller 30 may comprise various controller elements including processing elements 1605, memory 1610, driver controller elements 1615, a communication interface 1620, analog-digital converter elements 1625, and/or the like. For example, the processing elements 1605 may comprise programmable logic devices (CPLDs), microprocessors, coprocessing entities, application-specific instruction-set processors (ASIPs), integrated circuits, application specific integrated circuits (ASICs), field programmable gate arrays (FPGAs), programmable logic arrays (PLAs), hardware accelerators, other processing devices and/or circuitry, and/or the like. and/or controllers. The term circuitry may refer to an entirely hardware embodiment or a combination of hardware and computer program products. In an example embodiment, the processing element 1605 of the controller 30 comprises a clock and/or is in communication with a clock.

For example, the memory 1610 may comprise non-transitory memory such as volatile and/or non-volatile memory storage such as one or more of as hard disks, ROM, PROM, EPROM, EEPROM, flash memory, MMCs, SD memory cards, Memory Sticks, CBRAM, PRAM, FeRAM, RRAM, SONOS, racetrack memory, RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. In various embodiments, the memory 1610 may store a queue of commands to be executed to cause a quantum algorithm and/or circuit to be executed (e.g., an executable queue), qubit records corresponding the qubits of quantum computer (e.g., in a qubit record data store, qubit record database, qubit record table, and/or the like), a calibration table, computer program code (e.g., in a one or more computer languages, specialized controller language(s), and/or the like), and/or the like. In an example embodiment, execution of at least a portion of the computer program code stored in the memory 1610 (e.g., by a processing element 1605) causes the controller 30 to perform one or more steps, operations, processes, procedures and/or the like described herein for providing manipulation signals to atomic object positions and/or collecting, detecting, capturing, and/or measuring indications of emitted signals emitted by atomic objects located at corresponding atomic object positions of the atomic object confinement apparatus 300.

In various embodiments, the driver controller elements 1610 may include one or more drivers and/or controller elements each configured to control one or more drivers. In various embodiments, the driver controller elements 1610 may comprise drivers and/or driver controllers. For example, the driver controllers may be configured to cause one or more corresponding drivers to be operated in accordance with executable instructions, commands, and/or the like scheduled and executed by the controller 30 (e.g., by the processing element 1605). In various embodiments, the driver controller elements 1615 may enable the controller 30 to operate a voltage sources 50, manipulation sources 60, cooling system, and/or the like. In various embodiments, the drivers may be laser drivers configured to operate one or manipulation sources 60 to generate manipulation signals; vacuum component drivers; drivers for controlling the flow of current and/or voltage applied to electrodes used for maintaining and/or controlling the trapping potential of the atomic object confinement apparatus 300 (and/or other drivers for providing driver action sequences to potential generating elements of the atomic object confinement apparatus); cryostat and/or vacuum system component drivers; cooling system drivers, and/or the like. In various embodiments, the controller 30 comprises means for communicating and/or receiving signals from one or more optical receiver components (e.g., photodetectors of the optics collection system). For example, the controller 30 may comprise one or more analog-digital converter elements 1625 configured to receive signals from one or more optical receiver components (e.g., a photodetector of the optics collection system), calibration sensors, and/or the like.

In various embodiments, the controller 30 may comprise a communication interface 1620 for interfacing and/or communicating with a computing entity 10. For example, the controller 30 may comprise a communication interface 1620 for receiving executable instructions, command sets, and/or the like from the computing entity 10 and providing output received from the quantum computer 110 (e.g., from an optical collection system) and/or the result of a processing the output to the computing entity 10. In various embodiments, the computing entity 10 and the controller 30 may communicate via a direct wired and/or wireless connection and/or via one or more wired and/or wireless networks 20.

Exemplary Computing Entity

FIG. 17 provides an illustrative schematic representative of an example computing entity 10 that can be used in conjunction with embodiments of the present invention. In various embodiments, a computing entity 10 is configured to allow a user to provide input to the quantum computer 110 (e.g., via a user interface of the computing entity 10) and receive, display, analyze, and/or the like output from the quantum computer 110.

As shown in FIG. 17, a computing entity 10 can include an antenna 1712, a transmitter 1704 (e.g., radio), a receiver 1706 (e.g., radio), and a processing element 1708 that provides signals to and receives signals from the transmitter 1704 and receiver 1706, respectively. The signals provided to and received from the transmitter 1704 and the receiver 1706, respectively, may include signaling information/data in accordance with an air interface standard of applicable wireless systems to communicate with various entities, such as a controller 30, other computing entities 10, and/or the like. In this regard, the computing entity 10 may be capable of operating with one or more air interface standards, communication protocols, modulation types, and access types. For example, the computing entity 10 may be configured to receive and/or provide communications using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the computing entity 10 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1×(1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra wideband (UWB), infrared (IR) protocols, near field communication (NFC) protocols, Wibree, Bluetooth protocols, wireless universal serial bus (USB) protocols, and/or any other wireless protocol. The computing entity 10 may use such protocols and standards to communicate using Border Gateway Protocol (BGP), Dynamic Host Configuration Protocol (DHCP), Domain Name System (DNS), File Transfer Protocol (FTP), Hypertext Transfer Protocol (HTTP), HTTP over TLS/SSL/Secure, Internet Message Access Protocol (IMAP), Network Time Protocol (NTP), Simple Mail Transfer Protocol (SMTP), Telnet, Transport Layer Security (TLS), Secure Sockets Layer (SSL), Internet Protocol (IP), Transmission Control Protocol (TCP), User Datagram Protocol (UDP), Datagram Congestion Control Protocol (DCCP), Stream Control Transmission Protocol (SCTP), HyperText Markup Language (HTML), and/or the like.

Via these communication standards and protocols, the computing entity 10 can communicate with various other entities using concepts such as Unstructured Supplementary Service information/data (USSD), Short Message Service (SMS), Multimedia Messaging Service (MMS), Dual-Tone Multi-Frequency Signaling (DTMF), and/or Subscriber Identity Module Dialer (SIM dialer). The computing entity 10 can also download changes, add-ons, and updates, for instance, to its firmware, software (e.g., including executable instructions, applications, program modules), and operating system.

In various embodiments, the computing entity 10 may comprise a network interface 1720 for interfacing and/or communicating with the controller 30, for example. For example, the computing entity 10 may comprise a network interface 1720 for providing executable instructions, command sets, and/or the like for receipt by the controller 30 and/or receiving output and/or the result of a processing the output provided by the quantum computer 110. In various embodiments, the computing entity 10 and the controller 30 may communicate via a direct wired and/or wireless connection and/or via one or more wired and/or wireless networks 20.

The computing entity 10 may also comprise a user interface device comprising one or more user input/output interfaces (e.g., a display 1716 and/or speaker/speaker driver coupled to a processing element 1708 and a touch screen, keyboard, mouse, and/or microphone coupled to a processing element 1708). For instance, the user output interface may be configured to provide an application, browser, user interface, interface, dashboard, screen, webpage, page, and/or similar words used herein interchangeably executing on and/or accessible via the computing entity 10 to cause display or audible presentation of information/data and for interaction therewith via one or more user input interfaces. The user input interface can comprise any of a number of devices allowing the computing entity 10 to receive data, such as a keypad 1718 (hard or soft), a touch display, voice/speech or motion interfaces, scanners, readers, or other input device. In embodiments including a keypad 1718, the keypad 1718 can include (or cause display of) the conventional numeric (0-9) and related keys (#, *), and other keys used for operating the computing entity 10 and may include a full set of alphabetic keys or set of keys that may be activated to provide a full set of alphanumeric keys. In addition to providing input, the user input interface can be used, for example, to activate or deactivate certain functions, such as screen savers and/or sleep modes. Through such inputs the computing entity 10 can collect information/data, user interaction/input, and/or the like.

The computing entity 10 can also include volatile storage or memory 1722 and/or non-volatile storage or memory 1724, which can be embedded and/or may be removable. For instance, the non-volatile memory may be ROM, PROM, EPROM, EEPROM, flash memory, MMCs, SD memory cards, Memory Sticks, CBRAM, PRAM, FeRAM, RRAM, SONOS, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. The volatile and non-volatile storage or memory can store databases, database instances, database management system entities, data, applications, programs, program modules, scripts, source code, object code, byte code, compiled code, interpreted code, machine code, executable instructions, and/or the like to implement the functions of the computing entity 10.

Conclusion

Many modifications and other embodiments of the invention set forth herein will come to mind to one skilled in the art to which the invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A system comprising:
   an atomic object confinement apparatus comprising a plurality of electrodes configured to generate a confinement potential configured to confine one or more atomic objects, the confinement potential defining a plurality of atomic object positions; and
   one or more signal manipulation elements, each signal manipulation element of the one or more signal manipulation elements (a) associated with a respective atomic object position of the plurality of atomic object positions and (b) being one of:
      a collection array, the collection array configured to, responsive to an emitted signal emitted by an atomic object located at the respective atomic object position being incident on the collection array, provide an induced collection signal to a respective collection position, or
      an action array, the action array configured to, responsive to an incoming signal generated by a manipulation source being incident on the action array, provide an induced action signal to the respective atomic object position.

2. The system of claim 1, wherein the one or more signal manipulation elements comprise at least one of (a) a metamaterial array comprising a plurality of metamaterial structures or (b) a diffractive optical element.

3. The system of claim 1, wherein the one or more signal manipulation elements comprises an alignment arrangement comprising at least one metamaterial array.

4. The system of claim 1, wherein the one or more signal manipulation elements comprise at least one collection array and one or more action arrays associated with the respective atomic object position.

5. The system of claim 1, wherein the action array is configured for use in performing a quantum computer function selected from a group consisting of photoionization of an atomic object, state preparation of the atomic object, reading a quantum state of the atomic object, cooling the atomic object or an atomic object crystal comprising the atomic object, shelving the atomic object, repumping the atomic object, performing a single qubit gate on the atomic object, and performing a multiple qubit gate on a set of atomic objects comprising the atomic object.

6. The system of claim 5, wherein one or more metamaterial structures of the action array are wavelength-tuned for inducing an action beam of a wavelength used in performing the quantum computer function.

7. The system of claim 2, wherein one or more metamaterial structures of the plurality of metamaterial structures are pillars extending from a surface of the atomic object confinement device a distance in a range of 0.5 nm to 1 μm.

8. The system of claim 7, wherein each metamaterial structure of the plurality of metamaterial structures forms a metasurface.

9. The system of claim 1, wherein a surface of the atomic object confinement apparatus defines a plane, the one or more signal manipulation elements are disposed on the surface, and the action array is configured to receive an incoming signal that is propagating transverse to the plane.

10. The system of claim 1, wherein a surface of the atomic object confinement apparatus defines a plane and the collection position is located outside of the plane.

11. The system of claim 1, wherein the one or more signal manipulation elements are metasurface lenses formed on a surface of the atomic object confinement apparatus.

12. The system of claim 11, wherein at least one or more portions of a substrate of the atomic object confinement apparatus are transparent to at least one of light having a wavelength of the incoming signal or light having a wavelength of the emitted signal.

13. The system of claim 1, wherein the one or more signal manipulation elements are disposed on a second substrate, the second substrate disposed such that a surface of the second substrate comprising at least one of the one or more signal manipulation elements faces a surface of a first substrate having the plurality of electrodes of the atomic object confinement apparatus disposed thereon.

14. The system of claim 1 further comprising a controller configured to control operation of the plurality of electrodes and the manipulation source.

15. The system of claim 14, wherein the controller is further configured to receive a signal indicative of the collection signal being incident at the collection position.

16. The system of claim 14, wherein the system is part of a quantum computer and the controller is configured to control the operation of the plurality of electrodes and the at least one manipulation source to cause the quantum computer to execute at least a portion of a quantum circuit, wherein the one or more atomic objects are used as qubits of the quantum computer.

17. The system of claim 1, further comprising one or more optical elements configured to define an optical path from the manipulation source to the action array.

18. The system of claim 17, wherein the one or more optical elements comprise at least one of:
   a double-layer metasurface beam splitter;
   a photonic integrated circuit chip and one or more bulk optical components; or
   a photonic integrated circuit chip having integrated metasurfaces.

19. The system of claim 1, further comprising collection optics located at the collection position corresponding to the respective atomic object position, and one or more photodetectors optically coupled to the collection optics, the one or more photodetectors configured to generate a signal indicative of the collection signal being incident on the collection optics.

20. The system of claim 1, wherein a plurality of action arrays are associated with the respective atomic object position, a first action array of the plurality of action arrays configured to provide a first induced action signal responsive to the action signal being incident thereon and a second action array of the plurality of action arrays configured to provide a second induced action signal responsive to the action signal being incident thereon, the first induced action signal and the second induced action signal differing in at least one of a beam width at the respective atomic object position or a propagation path through the respective atomic object position.

* * * * *